(12) United States Patent
Matsueda et al.

(10) Patent No.: US 7,148,582 B2
(45) Date of Patent: Dec. 12, 2006

(54) BICYCLE INTERNAL GEAR SHIFTING HUB

(75) Inventors: Keiji Matsueda, Shimonoseki (JP);
Keita Tanaka, Shimonoseki (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/094,403

(22) Filed: Mar. 31, 2005

(65) Prior Publication Data

US 2005/0252750 A1    Nov. 17, 2005

(30) Foreign Application Priority Data

May 13, 2004 (JP) ............................. 2004-143747

(51) Int. Cl.
F02B 63/04 (2006.01)
B62J 6/12 (2006.01)
H02K 7/00 (2006.01)
H02K 11/00 (2006.01)
B62K 11/00 (2006.01)

(52) U.S. Cl. .................. 290/1 C; 310/67 A; 310/71; 310/75 C; 180/205

(58) Field of Classification Search ............. 290/1 R, 290/1 C, 1 D; 310/67 A, 67 R, 75 B, 75 C, 310/68 A; 180/205
See application file for complete search history.

(56) References Cited

U.S. PATENT DOCUMENTS

| | | | | |
|---|---|---|---|---|
| 2,267,956 A * | 12/1941 | Steinlein et al. | ............ | 180/205 |
| 2,430,705 A * | 11/1947 | Brown | ..................... | 310/75 R |
| 2,535,453 A * | 12/1950 | Rabl | ........................ | 310/75 R |
| 2,882,427 A * | 4/1959 | Hils et al. | ................. | 310/67 R |
| 5,268,602 A * | 12/1993 | Schwaller | ................. | 310/67 A |
| 6,057,617 A * | 5/2000 | Schmid | ........................ | 310/77 |
| 6,276,475 B1 * | 8/2001 | Nakanosono | .............. | 180/65.8 |
| 6,559,564 B1 * | 5/2003 | Itou | ........................ | 310/67 A |
| 6,607,465 B1 * | 8/2003 | Shoge | ........................ | 475/297 |
| 6,924,569 B1 * | 8/2005 | Endo et al. | ............... | 310/67 A |
| 6,992,413 B1 * | 1/2006 | Endo et al. | ............... | 310/67 A |
| 2003/0024339 A1 | 2/2003 | Fujii | | |
| 2005/0285461 A1 * | 12/2005 | Kitamura et al. | ........ | 310/67 A |

FOREIGN PATENT DOCUMENTS

JP    A-H10-230877    9/1998
JP    B-3501781    3/2004

OTHER PUBLICATIONS

U.S. Appl. No. 10/883,991, filed Jul. 6, 2004.

* cited by examiner

*Primary Examiner*—Julio C. Gonzalez
(74) *Attorney, Agent, or Firm*—Global IP Counselors, LLP

(57) ABSTRACT

An internal gear shifting hub includes a motor that assists in gear shifting operations. The internal gear shifting hub is mounted at on rear portion of a bicycle frame and includes a hub shaft, a drive cylinder, a hub shell, a power transmitting mechanism, a shift mechanism and a generator mechanism. The drive cylinder and hub shell are both rotatably mounted to the hub shaft. The power transmitting mechanism is mounted between the drive cylinder and the hub shell and transmits rotational force from the drive cylinder to the hub shell via one of a plurality of force transmission paths. The shift mechanism shifts between the plurality of transmission paths. The generator mechanism is mounted alongside the power transmitting mechanism inside the hub shell and generates electric power via the rotation of the hub shell to power the motor.

9 Claims, 14 Drawing Sheets

BICYCLE INTERNAL GEAR SHIFTING HUB

CROSS-REFERENCE TO RELATED APPLICATIONS

This application claims priority to Japanese Patent Application No. 2004-143747 filed May 13, 2004. The entire disclosure of Japanese Patent Application No. 2004-143747 is hereby incorporated herein by reference.

BACKGROUND OF THE INVENTION

1. Field of the Invention

The present invention relates to a bicycle internal gear shifting hub and more particularly to a bicycle hub with an internal gear shifting mechanism, with the bicycle hub being mounted to the rear end of a bicycle frame and provided with an internal generator for powering a shift actuator mechanism.

2. Background Information

The mounting of an internal gear shifting hub to the rear wheel of a bicycle in order to enable the rider to reduce the amount of energy expended during pedaling by selecting a mechanically advantageous gear ratio is known. A conventional internal gear shifting hub includes a hub shaft mounted to the rear end of the bicycle frame, a drive cylinder that is rotatably supported around the hub shaft and transmits the pedaling force via sprockets and a chain, and a hub shell that is rotatably supported around the hub shaft. A power transmitting mechanism that transmits rotational force from the drive cylinder to the hub shell via one of multiple force transmission paths is disposed between the drive cylinder where the hub shell, and each force transmission path ordinarily has a unique gear ratio. The power transmitting mechanism includes a planetary gear mechanism that has one or more sun gears that are rotatably supported around the hub shaft. The power transmitting mechanism also includes a ring gear that is rotatably supported around the hub shaft, a planet gear carrier that is rotatably supported around the hub shaft, and multiple planet gears that are rotatably supported on the planet gear carrier that engage the sun gear(s) and the ring gear. Any of the multiple force transmission paths and the corresponding gear ratio are engaged by selectively linking various components with each other in a non-rotatable fashion. For example, one gear ratio is selected by non-rotatably linking the sun gear(s) with the hub shaft. Another gear ratio is selected by non-rotatably linking the drive cylinder with the planet gear carrier. Still another gear ratio is selected by non-rotatably linking the drive cylinder with the ring gear.

In recent years, an internal gear shifting hub has been developed where the shifting operation for selecting a force transmission path is carried out using a motor, for instance, as disclosed in Japanese Patent Laid-Open No. H10-230877. Such a motor driven shifting device is referred to as an electric internal gear shifting hub that directly manipulates the position of an operation member causing it to rotate. The operation member includes a rotating cam used to switch the force transmission path via a gear positioning unit that includes a motor.

Japanese Patent No. 3501781 discloses a hub in which the gear positioning unit and the internal gear shifting hub are linked via a gear shift cable and the operation member is remotely positioned. Electric power is supplied to the gear positioning unit by a power source, such as a battery, and the motor is driven via this electric power.

With a conventional internal gear shifting hub where the operation to switch the internal gear shifting hub is carried out using a gear positioning unit, the power from a power source such as a battery is supplied to the gear positioning unit or the like. Where the gear positioning unit is operated using power from the battery, if the battery runs out of power, gear shifting can no longer be performed unless the battery is replaced. As a result, where gear shifting is carried out using a gear positioning unit, it is difficult to perform stable gear shifting of the internal gear shifting hub for a long period of time.

In view of the above, it will be apparent to those skilled in the art from this disclosure that there exists a need for an improved gear shifting design that overcomes the problems in the prior art. This invention addresses this need in the art as well as other needs, which will become apparent to those skilled in the art from this disclosure.

SUMMARY OF THE INVENTION

An object of the present invention is to enable power assisted gear shifting that can be performed in as stable a fashion as possible where the internal gear shifting hub is effected by a motor.

The bicycle gear internal gear shifting hub pertaining to a first aspect of the present invention is a hub that is mounted at the rear end of a bicycle frame and includes a hub shaft, a drive cylinder, a hub shell, a power transmitting mechanism, a shift mechanism and a generator mechanism. The hub shaft is non-rotatably mounted to the rear end of the frame. The drive cylinder is rotatably mounted to the hub shaft. The hub shell is cylindrical and is also rotatably mounted to the hub shaft. The power transmitting mechanism is mounted between the drive cylinder and the hub shell and transmits rotational force from the drive cylinder to the hub shell via one of a plurality of force transmission paths. The shift mechanism shifts between the plurality of transmission paths. The generator mechanism is mounted alongside the power transmitting mechanism within the hub shell and generates electric power via the rotation of the hub shell.

Using this internal gear shifting hub, when crank rotation is transmitted to the drive cylinder via the chain, the rotational force is transmitted from the drive cylinder via the force transmission path of the power transmitting mechanism engaged by the shift mechanism, whereby the hub shell rotates. When the force transmission path is changed via the shift mechanism, the rotation of the drive cylinder is transmitted to the hub shell using a different transmission path having a different gear ratio. When the hub shell thereupon rotates, the generator mechanism generates usable electric power. When the shift mechanism shifts gears using a motor-equipped gear positioning unit, the electric power generated via the rotation of the hub shell can be used by the gear positioning unit. Since the internal gear shifting hub includes the generator mechanism aligned with the power transmitting mechanism, consumption of the power supply can be reduced even where the shift mechanism undergoes gear shifting using the gear positioning unit. For example, by storing the power generated by the generator mechanism in a condenser element and using this stored power as a power supply, the condenser element can be continually charged when the bicycle is being ridden and consumption of the power supply can be minimized. As a result, where the internal gear shifting hub is operated by a motor, gear shifting can be carried out in as stable a fashion as possible for a long period of time. Furthermore, because the generator mechanism is disposed inside the internal gear shifting hub, there is no need for a separate generator mechanism on the bicycle.

The bicycle internal gear shifting hub in a second aspect of the present invention has the gear shifting hub further including a shift assist mechanism and a force control mechanism. The shift assist mechanism transmits rotational force from the drive cylinder to the shift mechanism. The force control mechanism is mounted between the drive cylinder and the shift assist mechanism and links the drive cylinder to the shift assist mechanism thereby controlling the amount of rotational force transmitted from the drive cylinder to the shift mechanism. In this case, since the force control mechanism ensures that excessive force from pedaling is not transmitted to the shift mechanism, damage to the shift mechanism can be prevented.

The bicycle internal gear shifting hub according to a third aspect of the present invention has the shift mechanism including an operation member rotatably mounted to the hub shaft and a pawl control sleeve that is rotatably supported around the hub shaft and is linked to the operation member such that it rotates in response to the rotation thereof.

The bicycle internal gear shifting hub according to a fourth aspect of the present invention includes the shift assist mechanism transmitting rotational force from the drive cylinder to the pawl control sleeve.

The bicycle internal gear shifting hub according to a fifth aspect of the present invention has the shift assist mechanism including first shift members, second shift members and force applying devices. The first shift members are linked to the operation member such that they rotate together therewith. The second shift members are linked to the pawl control sleeve such that they rotate together therewith. The force applying devices apply force to the first and second shift such that the first shift members rotate together with the second shift members until the first shift members rotate relative to the second shift members.

The bicycle internal gear shifting hub according to a sixth aspect of the present invention includes the generating mechanism having a stator and a rotor. The stator has a coil member that is rotatably secured to the hub shaft. The rotor includes a permanent magnet and is mounted to the hub shell. In this case, because a coil that generates current during power generation is secured to the hub shaft, it is easy to draw power therefrom.

The bicycle internal gear shifting hub according to a seventh aspect of the present invention has the gear shifting hub further including a brake mounting portion disposed on the hub shell or on a rotating member that rotates in tandem with the hub shell, and enables the mounting of a hub brake device that brakes the hub shell. In this case, a brake apparatus that is not easily affected by rim deformation can be mounted to the hub shell or other component in a simple fashion.

According to the present invention, because the generator mechanism is mounted alongside the power transmitting mechanism inside the internal gear shifting hub, consumption of the power supply can be minimized even where the shift mechanism undergoes gear shifting via a gear positioning unit. For example, by storing the power generated by the generator mechanism in a condenser element and using this stored power as a power supply, the condenser element can be continually charged when the bicycle is being ridden and consumption of the power supply can be minimized. Consequently, gear shifting can be performed in as stable a fashion as possible for a long period of time where the internal gear shifting hub is operated by a motor. Furthermore, because the internal gear shifting hub includes a generator mechanism, there is no need for a separate generator mechanism on the bicycle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
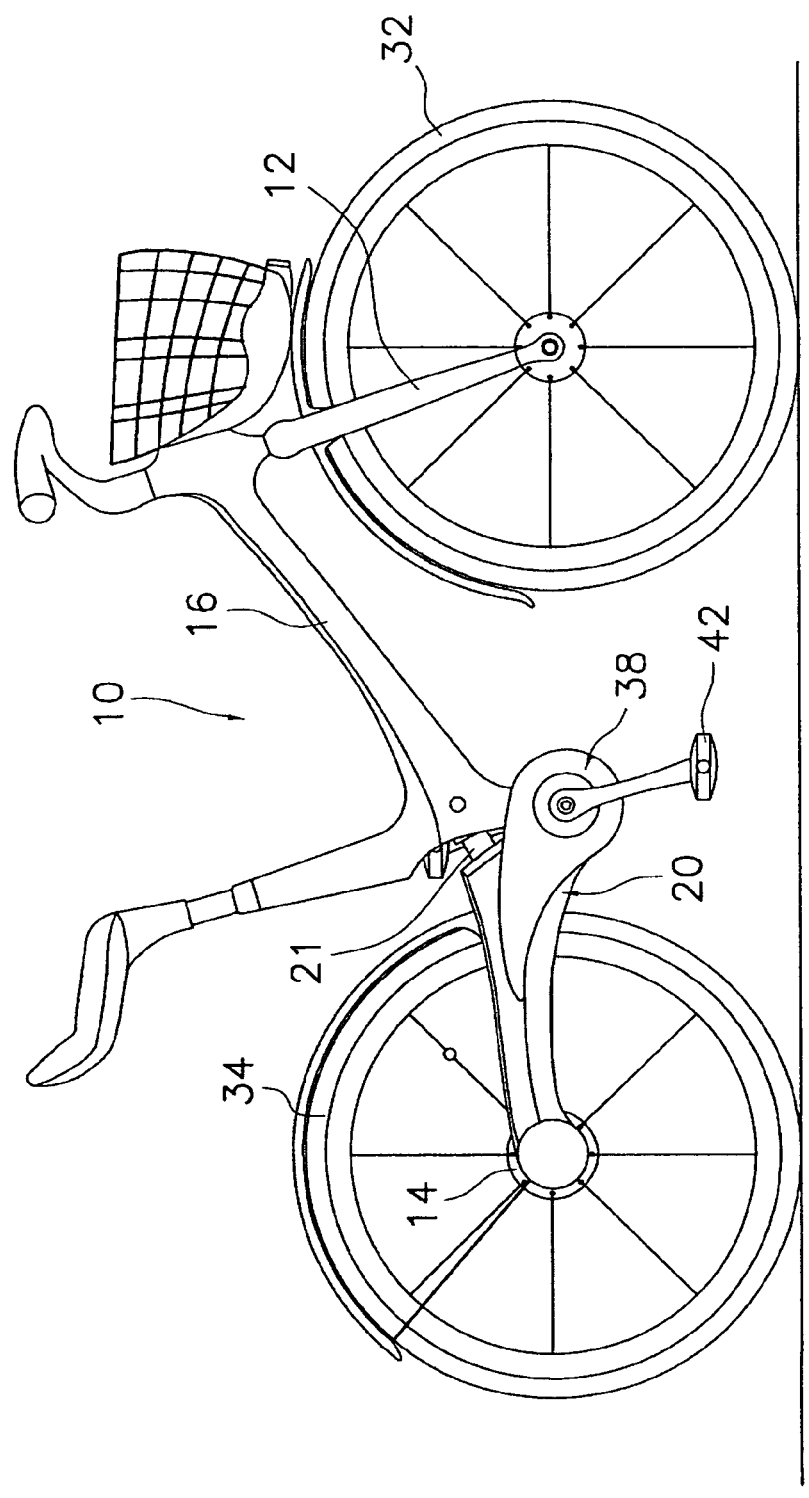
FIG. 1 is a side view of a bicycle that includes a rear hub having an internal gear shifting mechanism in accordance with the present invention.

Referring initially to FIG. 1, a bicycle 10 is illustrated in accordance with a first embodiment of the present invention.

First Embodiment

FIG. 1 shows a side view of the bicycle 10 that includes an internal gear shifting hub 14 pertaining to an embodiment of the present invention.

Figure 2:
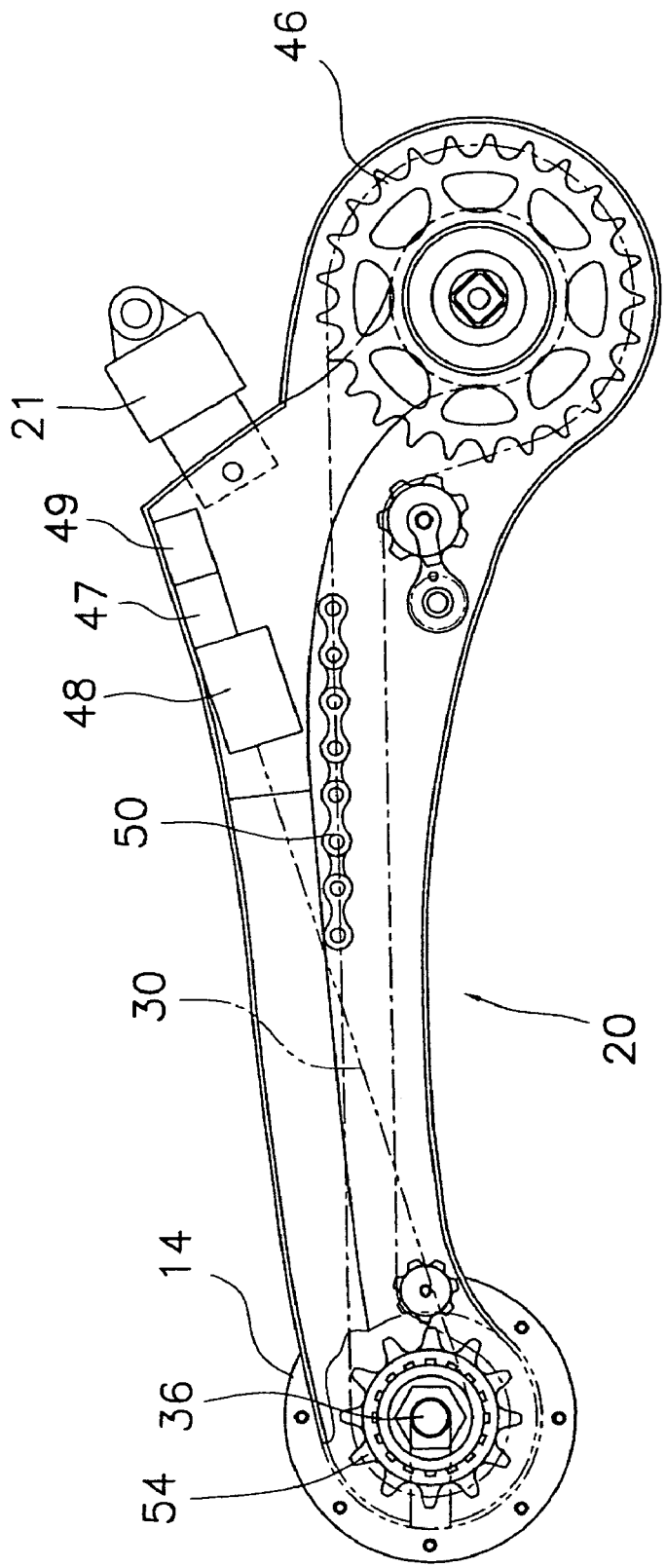
FIG. 2 is a side cross-sectional view of a drive unit of the bicycle shown in FIG. 1, in accordance with the present invention.

The bicycle 10 includes a front fork 12, a frame 16, a drive unit 20 and a crank assembly 38. The front fork 12 is rotatably mounted at a front portion of the frame 16. A front wheel 32 is rotatably mounted to a lower end of the front fork 12. The drive unit 20 is mounted to a rear portion of the frame 16. A rear wheel 34 is mounted at a rear end of the drive unit 20. As shown in FIG. 2, the rear wheel 34 is rotatably supported on a hub shaft 36 that is mounted to the rear portion of the drive unit 20. The crank assembly 38 is supported in the drive unit 20 and includes pedals 42. A front sprocket 46 is rotatably supported at the rear portion of the frame 16 and a front portion of the drive unit 20.

As shown in FIG. 2, the chain 50 extends around the front sprocket 46 and a rear sprocket 54 that drives the rotation of the internal gear shifting hub 14, both the front and rear sprockets 46 and 54 being housed inside the drive unit 20. The front portion of the drive unit 20 is pivotally coupled to the rear portion of the frame 16. The drive unit 20 extends from the linkage area (the rear portion of the frame 16) back passed the hub shaft 36. The drive unit 20 has a bifurcated structure with two mating sections. A suspension element 21 is mounted between the drive unit 20 and the frame 16 and serves as a shock absorber and spring biasing that cushions undulated movement between the drive unit 20 and the frame 16.

A gear positioning unit 48 that changes the gear ratio of the internal gear shifting hub 14 is disposed inside the drive unit 20. The gear positioning unit 48 positions and causes rotation of a shift mechanism 84 of the internal gear shifting hub 14, as described below. The gear positioning unit 48 is linked to an actuator plate 104 of the shift mechanism 84 of the internal gear shifting hub 14 via a gear shift cable 30, as described below. The rotational position of a positioning mechanism can be effected via a motor disposed inside the gear positioning unit 48. For the gear positioning unit 48 having this construction, the apparatus disclosed in Japanese Patent No. 3501781 referenced above may be used, for example. A gear shift controller 47 that includes a microcomputer, a motor driver and a rectifier circuit and that controls the gear positioning unit 48 and a condenser element 49 serves as a power source are disposed inside the drive unit 20 alongside the gear shift determining unit 48. The condenser element 49 is, for example, a high-capacity condenser such as an electric double layer condenser or a secondary battery such as a rechargeable lithium battery.

Construction of Internal Gear Shifting Hub

Figure 3:
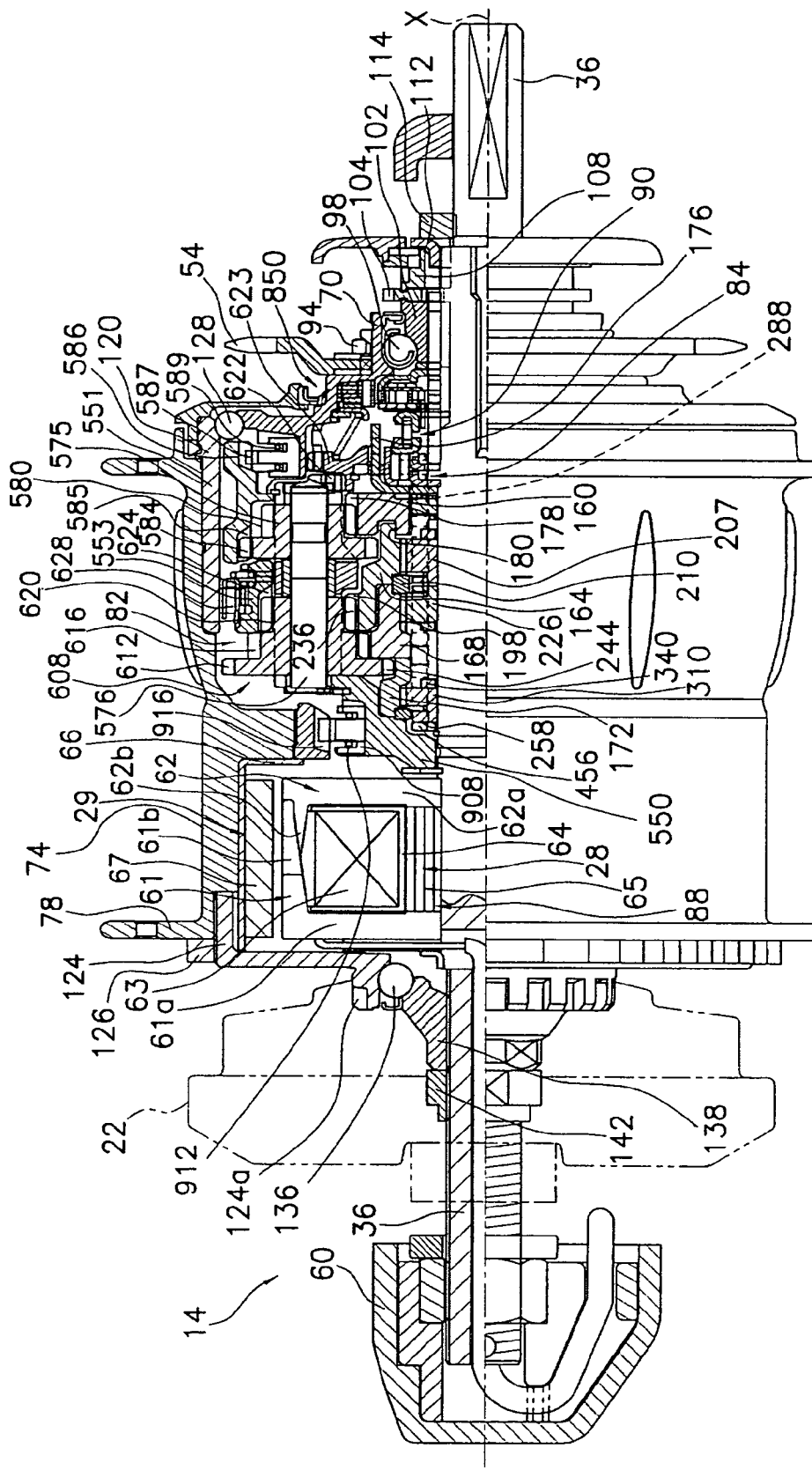
FIG. 3 is a partial cross-sectional view of the internal gear shifting hub, in accordance with the present invention.

FIG. 3 shows a cross-sectional view of the internal gear shifting hub 14 according to this embodiment.

The internal gear shifting hub 14 includes a hub shaft 36, a drive cylinder 70, a cylindrical hub shell 74, a power transmitting mechanism 82, a shift mechanism 84, shift assist mechanism 90, and a generator mechanism 88. The drive cylinder 70 is rotatably supported around the hub shaft 36. The cylindrical hub shell 74 has a hub flange 78 rotatably supported around the hub shaft 36. The power transmitting mechanism 82 is disposed between the drive cylinder 70 and the hub shell 74 and transmits the rotational force from the drive cylinder 70 to the hub shell 74 via one of multiple force transmission paths. The shift mechanism 84 effects shifting between the multiple force transmission paths. The shift assist mechanism 90 uses rotational motion of the drive cylinder 70 to assist in the shifting between the force transmission paths in the power transmitting mechanism 82. The generator mechanism 88 generates power via the rotation of the hub shell 74.

The rear sprocket 54 is connected to the drive cylinder 70 via splines (not shown) and held in position by a snap ring 94. The drive cylinder 70 is rotatably supported around the hub shaft 36 via a ball bearing 98 and a bearing cone 102. The bearing cone 102 is maintained in a fixed position by an actuator plate 104 (an operation member), a spacer 108, a washer 112 and a lock nut 114 that together make up the shift mechanism 84.

A left cup 124 is screwed on and secured to an inner circumferential surface of the left side of the hub shell 74 in FIG. 3. The left cup 124 is formed with a brake mounting portion 124a that includes a plurality of splines. A hub brake apparatus 22 is mounted to the brake mounting portion 124a via the splines. The hub brake apparatus 22 selectively provides braking force to the rear wheel 34 via the hub shell 74.

The hub brake apparatus 22 includes conventional brake elements, such as a disk brake, roller brake, drum brake, hand brake or the like. A right cup 120 is non-rotatably fitted to the inner circumferential surface of the right side of the hub shell 74. The right cup 120 supports the hub shell 74 via a ball bearing 128 such that it can rotate relative to the drive cylinder 70. The internal components at the right side of the internal gear shifting hub 14 are protected from external contaminants by a shell cup 132 that is fitted to the top part of the right cup 120. The left cup 124 rotatably supports the hub shell 74 on the hub shaft 36 via a ball bearing 136 and a cone 138. The left cup 124 is prevented from rotating by a lock nut 126. The brake mounting portion 124a used for mounting the hub brake apparatus 22 that brakes the rear wheel 34 via the hub shell 74 is disposed on the outer circumferential surface of the left cup 124 at the left side of FIG. 3. The cone 138 is secured to the hub shaft 36 via a stop nut 142.

Figure 4:
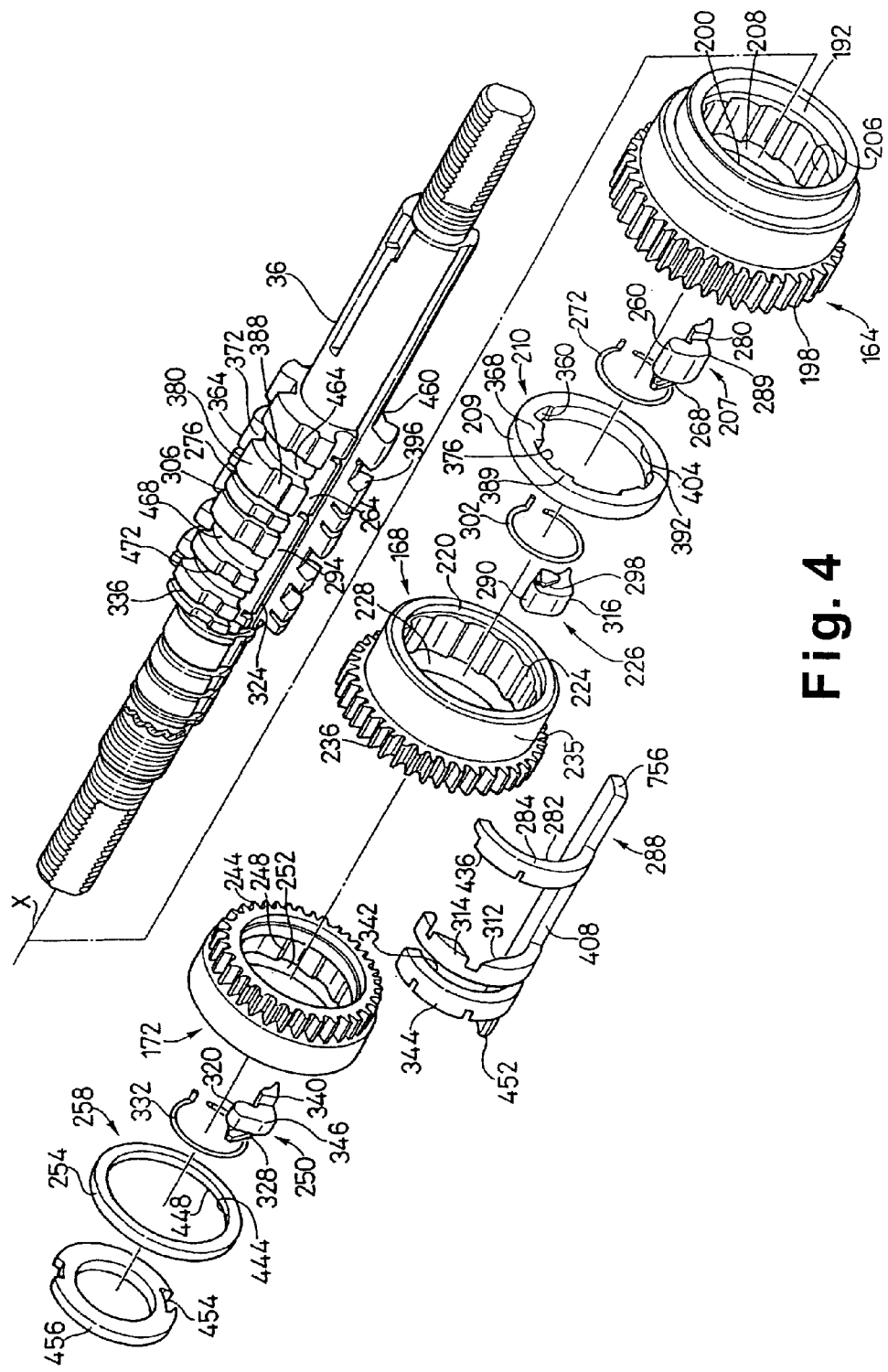
FIG. 4 is an exploded perspective view of a shaft and sun gears of the internal gear shifting hub shown in FIG. 3, in accordance with the present invention.

As shown in FIGS. 3 and 4, the power transmitting mechanism 82 includes a first sun gear 160, a second sun gear 164, a third sun gear 168 and a fourth sun gear 172. The first sun gear 160 is non-rotatably connected to the hub shaft 36 and includes clutch cam parts 176, first sun gear teeth 178 and a second sun gear contact surface 180. Preferably, there are forty-eight first sun gear teeth 178 formed on the outer circumferential surface thereof. The second sun gear contact surface 180 contacts with the second sun gear 164 on its outer circumference.

As can be seen most clearly from FIG. 4, the second sun gear 164 is rotatably supported around the hub shaft 36 adjacent to the first sun gear 160. The second sun gear 164 includes a first sun gear contact surface 192, a plurality second sun gear ratchet teeth 206, a guide ring contact surface 208. a third sun gear contact surface 200, and a plurality of second sun gear teeth 198. The first sun gear contact surface 192 is formed on an inner circumference of the second sun gear 164 and has slidable contact with the second sun gear contact surface 180 of the first sun gear 160. Preferably, there are twelve (12) second sun gear ratchet teeth 206 formed on an inner circumferential surface of the second sun gear 164 such that they engage a second sun gear pawl 207. The guide ring contact surface 208 has slidable contact with the outer circumferential surface 209 of the sun gear guide ring 210. Preferably, there are forty-eight (48) second sun gear teeth 198 formed on the outer circumferential surface of the second sun gear 164.

The third sun gear 168 is rotatably supported around the hub shaft 36 adjacent to the second sun gear 164 and includes a first guide ring contact surface 220, a plurality of third sun gear ratchet teeth 224, an outer circumferential second sun gear contact surface 235 and a plurality of third sun gear teeth 198. The first guide ring contact surface 220 has slidable contact with the outer circumferential surface 209 of the sun gear guide ring 210. There are preferably twelve (12) third sun gear ratchet teeth 224 formed on the inner circumferential surface of the third sun gear 168 that engage a third sun gear pawl 226. The outer circumferential second sun gear contact surface 235 has slidable contact with the third sun gear contact surface 200 of the second sun gear 164. There are preferably forty-two (42) third sun gear teeth 198 on the outer circumferential surface of the third sun gear 168.

The fourth sun gear 172 includes a plurality of fourth sun gear teeth 244, a plurality of fourth sun gear ratchet teeth 248 and a guide ring contact surface 252. Preferably there are thirty-six (36) fourth sun gear teeth 244 formed on the outer circumferential surface of the fourth sun gear 172. Preferably, there are twelve (12) fourth sun gear ratchet teeth 248 formed on the inner circumferential surface of the fourth sun gear 172 that engage a fourth sun gear pawl 250. The guide ring contact surface 252 has slidable contact with the outer circumferential surface of the guide ring 258.

The pawl 207 includes a pawl seat 260, a spring receiving groove 268, a pawl contact surface 280, and a pawl tooth 289. The pawl seat 260 engages a pawl receiving groove 264 formed in the hub shaft 36 such that it can revolve. The spring receiving groove 268 receives a spring 272 disposed in a spring receiving groove 276 formed in the hub shaft 36. The pawl contact surface 280 comes into contact with the inner circumferential surface 282 of the pawl control arm 284 of a pawl control sleeve 288 of the shift mechanism 84. The pawl tooth 289 engages the second sun gear ratchet teeth 206.

Similarly, the pawl 226 includes a pawl seat 290, a spring receiving groove 298, a pawl contact surface 310, and a pawl tooth 316. The pawl seat 290 engages a pawl receiving groove 294 formed in the hub shaft 36 such that it can revolve. The spring receiving groove 298 receives a spring 302 disposed in a spring receiving groove 306 formed in the hub shaft 36. The pawl contact surface 310 (see FIG. 3) contacts the inner circumferential surface 312 of the pawl control arm 314 of the pawl control sleeve 288. The pawl tooth 316 engages the third sun gear ratchet teeth 224.

Finally, the pawl 250 includes a pawl seat 320, a spring receiving groove 328, a pawl contact surface 340 and a pawl tooth 346. The pawl seat 320 engages a pawl receiving groove 324 formed in the hub shaft 36 such that it can revolve. The spring receiving groove 328 receives a spring 332 disposed in a spring receiving groove 336 formed in the hub shaft 36. The pawl contact surface 340 (see FIG. 3) contacts the inner circumferential surface 342 of the pawl control arm 344 of the pawl control sleeve 288. The pawl tooth 346 engages the fourth sun gear ratchet teeth 248. Force is applied to the pawl teeth 289, 316 and 346 of the pawls 207, 226 and 250, respectively, in the outward radial direction via corresponding springs 272, 302 and 332, as known in the art.

In accordance with the present invention, approximately half of the sun gear guide ring 210 is fitted between the guide ring contact surface 208 of the second sun gear 164 and the hub shaft 36, and the other half of the sun gear guide ring 210 is fitted between the first guide ring contact surface 220 of the third sun gear 168 and the hub shaft 36. The sun gear guide ring 210 includes the outer circumferential surface 209, a securing groove 360, a securing protrusion 368, a securing groove 372, a securing protrusion 389, a securing groove 392 and a control sleeve support surface 404. The securing groove 360 selectively engages a securing stepped area 364 formed in the hub shaft 36 along the X-axis, as indicated in FIG. 4. The securing protrusion 368 selectively engages a securing groove 372 formed in the hub shaft 36 along the X-axis. The securing groove 376 selectively engages with a securing stepped area 380 formed in the hub shaft 36 along the X-axis. The securing protrusion 389 selectively engages a securing groove 388 formed in the hub shaft along the X-axis. The securing groove 392 selectively engages a securing stepped area 396 formed in the hub shaft 36 along the X-axis. The control sleeve support surface 404 supports a base portion 408 of the pawl control sleeve 288 between the sun gear guide ring 210 and the hub shaft 36.

The sun gear guide ring 254 is fitted between the guide ring contact surface 252 of the fourth sun gear 172 and the hub shaft 36. Unlike the sun gear guide ring 210, the sun gear guide ring 254 includes a circular inner circumferential surface 444 that is disposed around the securing stepped areas 364, 380 and 396 formed in the hub shaft 36. Part of the circular inner circumferential surface 444 comprises a control sleeve support surface 448 that holds the end 452 of the base portion 408 between the sun gear guide ring 258 and the hub shaft 36. The end 452 of the base portion 408 extends to a groove 454 in a washer 456.

The base portion 408 of the pawl control sleeve 288 is rotatably fitted inside the control sleeve groove 460 formed in the hub shaft 36 along the X-axis, and is supported around the shaft by the sun gear guide rings 210 and 258. The pawl control arms 284, 314 and 344 are slidably disposed inside the control arm grooves 464, 468 and 472, respectively, formed on the outer circumference of the hub shaft 36. The detailed construction and operation of the pawl control sleeve 288 is well known in the art, and a more detailed explanation may be found in U.S. patent application Ser. No. 09/522,703 submitted on Mar. 10, 2000, now U.S. Pat. No. 6,607,465.

Figure 5:
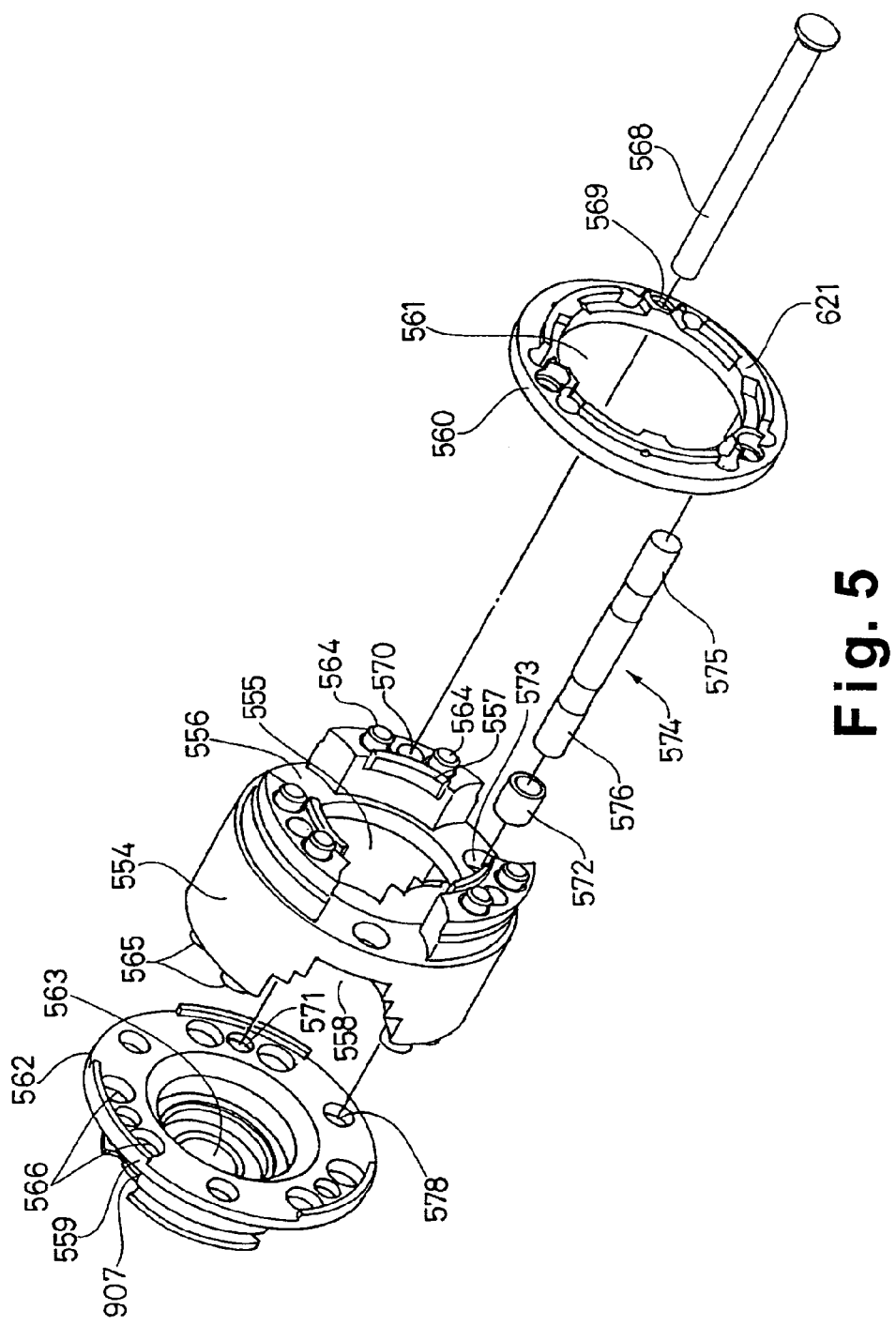
FIG. 5 is an exploded view of a planet gear carrier used in the internal gear shifting hub shown in FIG. 3, in accordance with the present invention.
Figure 7:
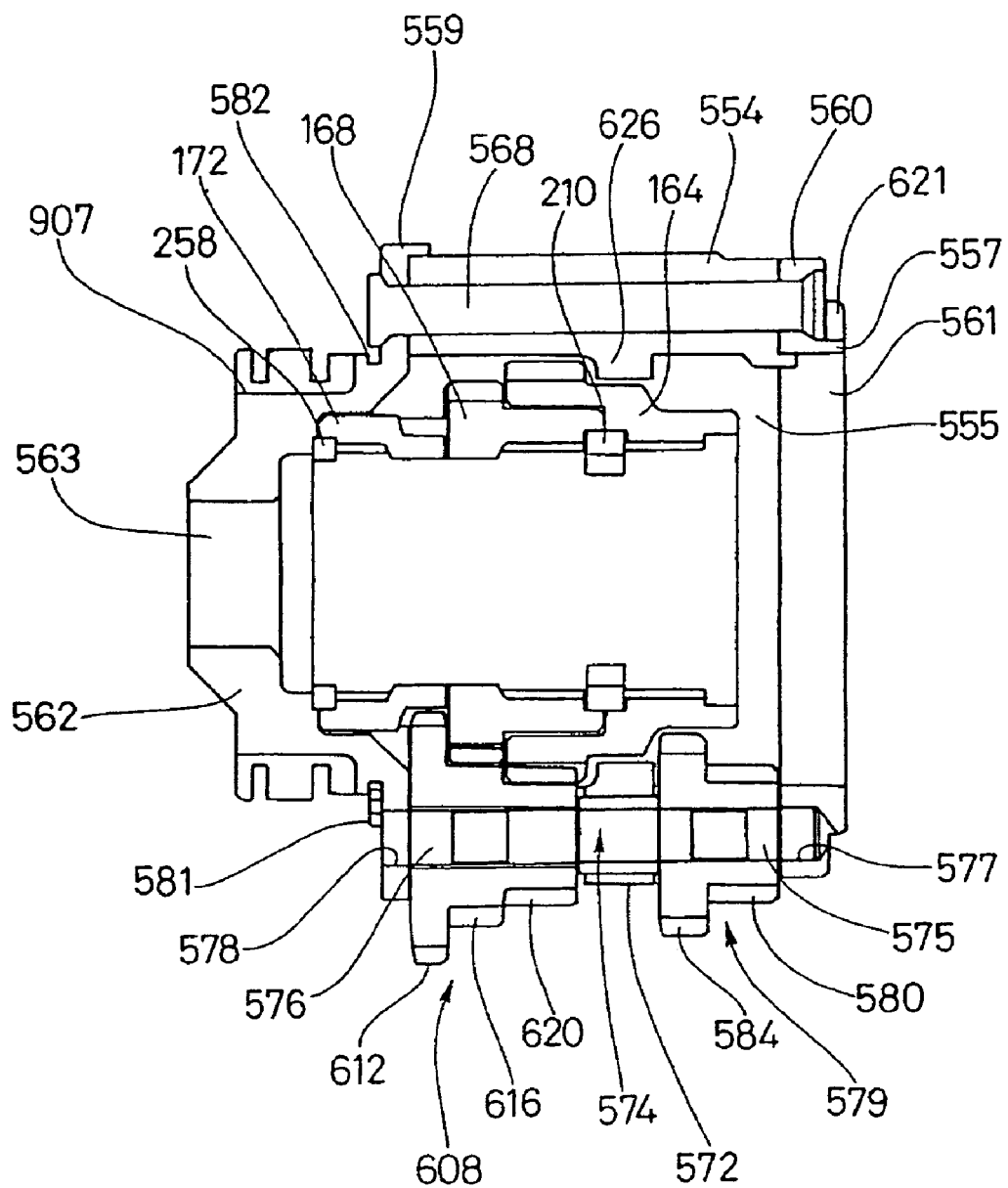
FIG. 7 is a side cross-sectional view of a planet gear carrier in the assembled state, in accordance with the present invention.

As shown in FIG. 3, the power transmitting mechanism 82 further includes a planet gear carrier 550, a first ring gear 551 and a second ring gear 553, all of which are rotatably supported around the hub shaft 36. As shown in FIGS. 5 and 7, the planet gear carrier 550 includes a first carrier member 554, a plurality of first planet gear openings 556, a plurality of second planet gear openings 558, a second carrier member 560, and a third carrier member 562. The first carrier member 554 that has a first carrier member shaft opening 555 that receives the hub shaft 36. There are preferably three (3) first planet gear openings 556 formed on one side of the carrier member 554 that receive multiple first planet gears 579. Further, there are three (3) second planet gear openings 558 formed on the other side of the carrier member 554 that receive multiple second planet gears 608 and are larger than the first planet gear openings 556. The second carrier member 560 has a second carrier member shaft opening 561 that receives the hub shaft 36 passing therethrough. The third carrier member 562 has a third carrier member shaft opening 563 that receives the hub shaft 36 passing therethrough. The first carrier member 554 according to the present invention is formed of a lightweight alloy such as aluminum alloy, while the second carrier member 560 and the third carrier member 562 are formed of a sturdier metal such as steel.

Three pairs of first carrier pins 564 are disposed in the first carrier member 554 such that the first carrier member 554 is non-rotatably linked to the second carrier member 560. The pairs of first carrier pins 564 are circumferentially spaced apart from one another and are disposed between corresponding pairs of first planet gear openings 556. Correspondingly, three pairs of second carrier pins 565 are provided in the first carrier member 554 such that the first carrier member 554 is non-rotatably linked to the third carrier member 562. Each pair of second carrier pins 565 is disposed between corresponding pairs of second planet gear openings 558. Each first planet gear opening 556 is disposed on an opposite axial side of the first carrier member 554 from the corresponding second planet gear opening 558. Correspondingly, each pair of first carrier pins 564 is disposed on the opposite axial side from the corresponding pair of second carrier pins 565.

The first carrier pins 564 and second carrier pins 565 function as a linking mechanism to link the first carrier member 554, the second carrier member 560 and the third carrier member 562. The first carrier pins 564 are press-fitted into surfaces of the first carrier member 554 and extend axially outward therefrom. The first carrier pins 564 are press-fitted into holes (not shown) formed in the second carrier member 560, while the second carrier pins 565 are press-fitted into holes 566 formed in the third carrier member 562. The first carrier member 554 is designed so that the second carrier member 560 and the third carrier member 562 come into direct contact with respective surfaces of the first carrier member 554. In order to enable this connection, an annular groove 567 is formed around each of the carrier pins as shown in FIG. 6, and functions as a receptacle for shavings from the pin or carrier member generated when the carrier members are press-fitted together.

Figure 6:
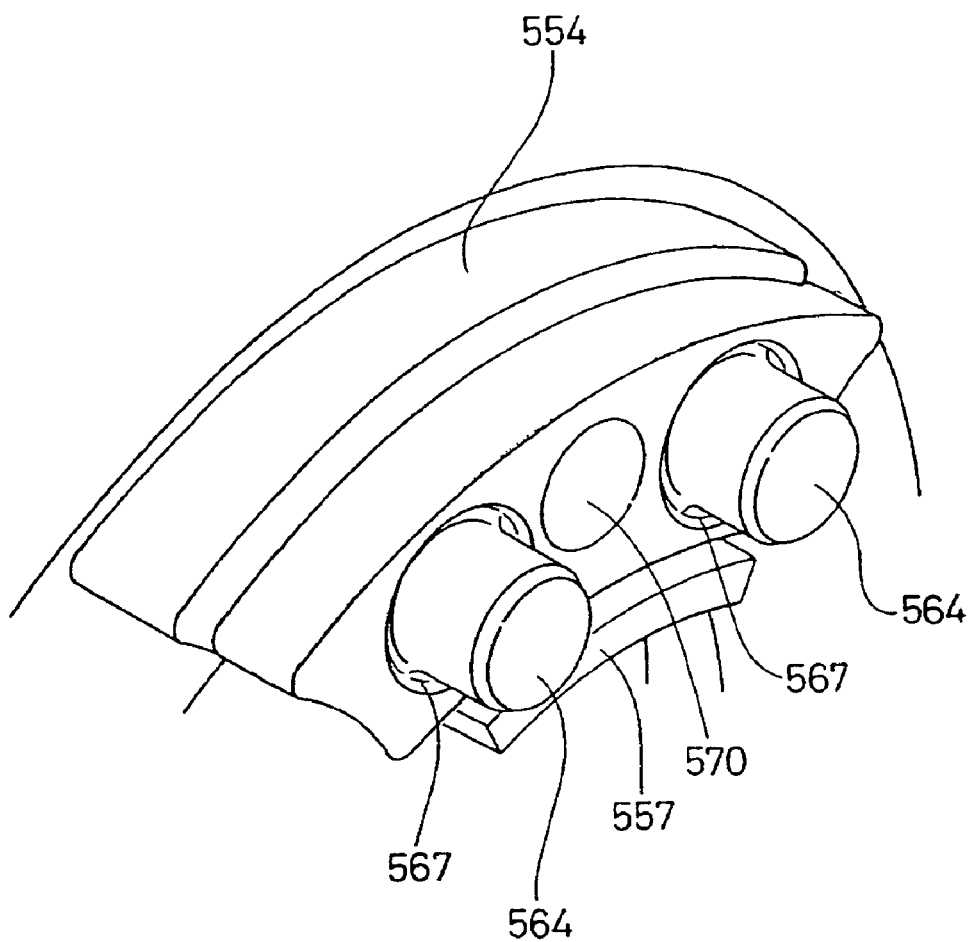
FIG. 6 is a detailed view of a linking member of the planet gear carrier shown in FIG. 5, in accordance with the present invention.

The first carrier member 554 is formed with three guide ribs 557, as shown in FIG. 6. The guide ribs 557 extend from the inner circumferential surface of the first carrier member 554 and are located radially inward of each pair of carrier pins 564. The guide ribs 557 engage an inner circumferential surface of the second carrier member 560. Similarly, three guide ribs 559 are formed at an outer circumferential portion of the third carrier member 562, as shown in FIG. 5. The three guide ribs 559 extend from the outer circumferential surface of the third carrier member 562 and are disposed radially outward from each pair of holes 566. The three guide ribs 559 engage with the outer circumferential surface of the first carrier member 554.

The guide ribs 557 and 559 make assembly easier and are useful in strengthening the connections between the first carrier member 554, the second carrier member 560 and the third carrier member 562.

The first carrier member 554, second carrier member 560 and third carrier member 562 are secured and linked to one another via three rivets 568 (only one of which is shown in FIGS. 5 and 7). The rivets 568 pass through the openings 569 in the second carrier member 560, the openings 570 in the first carrier member 554 and the openings 571 in the third carrier member 562. Accordingly, each rivet 568 extends in an axial direction between respective pairs of first carrier pins 564 and respective pairs of second carrier pins 565. Three bushings 572 (only one of which is shown in FIGS. 5 and 7) are press-fitted into the corresponding openings 573 in the first carrier member 554.

The bushings 572 support respective master pinion pins 574. There are three master pinion pins 574 (only one is shown in FIGS. 5 and 7), each unitarily formed with a first pinion portion 575 and second pinion portion 576. Each master pinion pin 574 extends through the first carrier member 554 such that the first pinion portion 575 is disposed inside a corresponding one of the first planet gear openings 556 and is supported inside a corresponding blind hole 577 formed in the second carrier member 560. The second pinion portion 576 is disposed inside the second planet gear opening 558 and is supported inside a corresponding opening 578 formed in the third carrier member 562.

The master pinion pins 574 are secured inside the planet gear carrier 550 by a stopper ring 582 (see FIG. 7) that prevents axial movement. The stopper ring 582 is fitted inside a stopper ring groove 582 formed on the outer circumferential surface of the third carrier member 562. Each first pinion portion 575 rotatably supports one first planet gear 579, as shown in FIG. 7. Each first planet gear 579 has a small-diameter gear portion 580 that includes fourteen (14) gear teeth. The small-diameter gear portion 580 engages the plurality of first sun gear teeth 178 on the first sun gear 160. The first planet gear 579 also includes a large-diameter gear portion 584 formed with twenty-two (22) gear teeth that engage the first inner circumferential gear portion 585 of the first ring gear 551. Similarly, each second pinion portion 576 rotatably supports one second planet gear 608. Each second planet gear 608 has a large-diameter gear portion 612 with twenty-nine (29) gear teeth that engage the plurality of fourth sun gear teeth 244 of the fourth sun gear 172. Each second planet gear 608 also includes a medium-diameter gear portion 616 formed with eighteen (18) gear teeth that engage the plurality of third sun gear teeth 236 of the third sun gear 168. Each second planet gear 608 also includes a small-diameter gear portion 620 formed with fourteen (14) gear teeth that engage the multiple second sun gear teeth 198 of the second sun gear 164. The small-diameter gear portion 620 of the second planet gear 650 also engages the inner circumferential gear portion 624 of the second ring gear 553. The inner circumferential gear portion 624 is preferably formed with seventy-eight (78) gear teeth.

Figure 9:
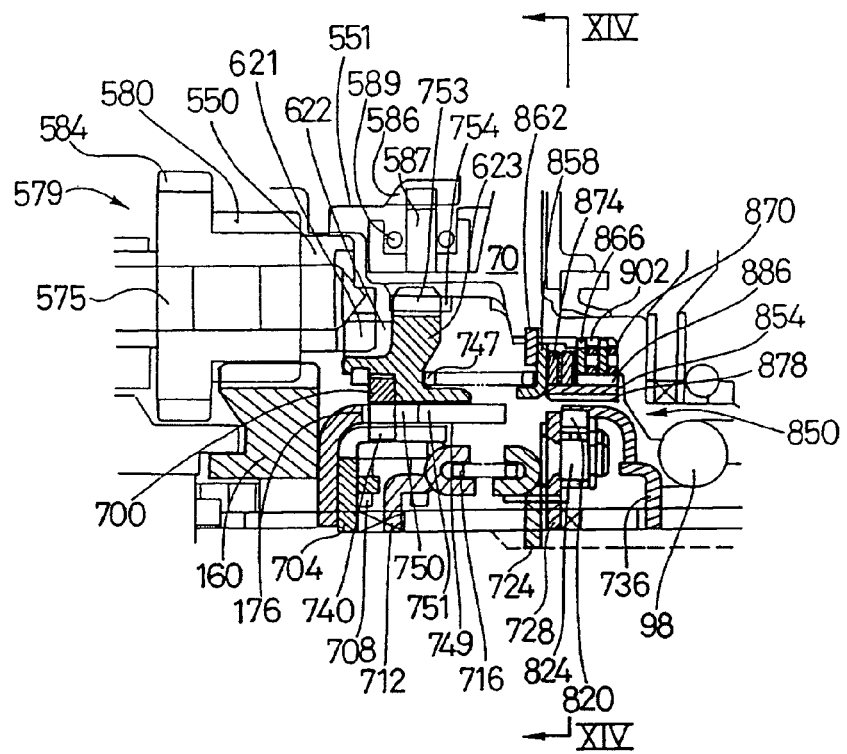
FIG. 9 is a detailed side view of the shift assist apparatus that includes a force control mechanism in an inoperative state, in accordance with the present invention.

The first carrier member 554 also includes a radially inwardly protruding wall surface 626 that retains the second sun gear 164 such that it does not move in the axial direction. The second carrier member 560 is preferably formed with twelve (12) clutch engaging splines 621 that are circumferentially disposed on the right side of the second carrier member 560 in FIG. 5. The clutch engaging splines 621 engage a plurality of auxiliary planet gear carrier engaging splines 622 formed on a clutch ring 623, as shown in FIG. 9. The third carrier member 562 preferably includes three (3) pawl receiving grooves 907 on its outer circumferential surface, as shown in FIG. 3. A plurality of corresponding circumferential pawls 908 are supported therein. Biasing force is applied to each pawl 908 in the outward radial direction by a pawl spring 912 such that they engage with an inner circumferential gear 916 formed on the right side of the left cup 124. The pawls 908 transmit the forward rotation of the planet gear carrier 550 to the left cup 124, whereby such rotation is also transmitted to the hub shell 74.

The first ring gear 551 also includes a second inner circumferential gear portion 586, in addition to the first inner circumferential gear portion 585. The second inner circumferential gear portion 586 includes thirty-six (36) gear teeth that engage pawls 587 disposed on the outer circumferential surface of the drive cylinder 70. Each pawl 587 receives a biasing force in the outward radial direction from a pawl spring 589. Therefore, the pawls 587 function together as a one-way clutch between the drive cylinder 70 and the first ring gear 551. The second ring gear 553 is linked to the right cup 120 by a one-way clutch that includes a roller clutch 628 with eighteen (18) rollers and cam surfaces, for example, and is thereby linked to the hub shell 74 as well.

Figure 8:
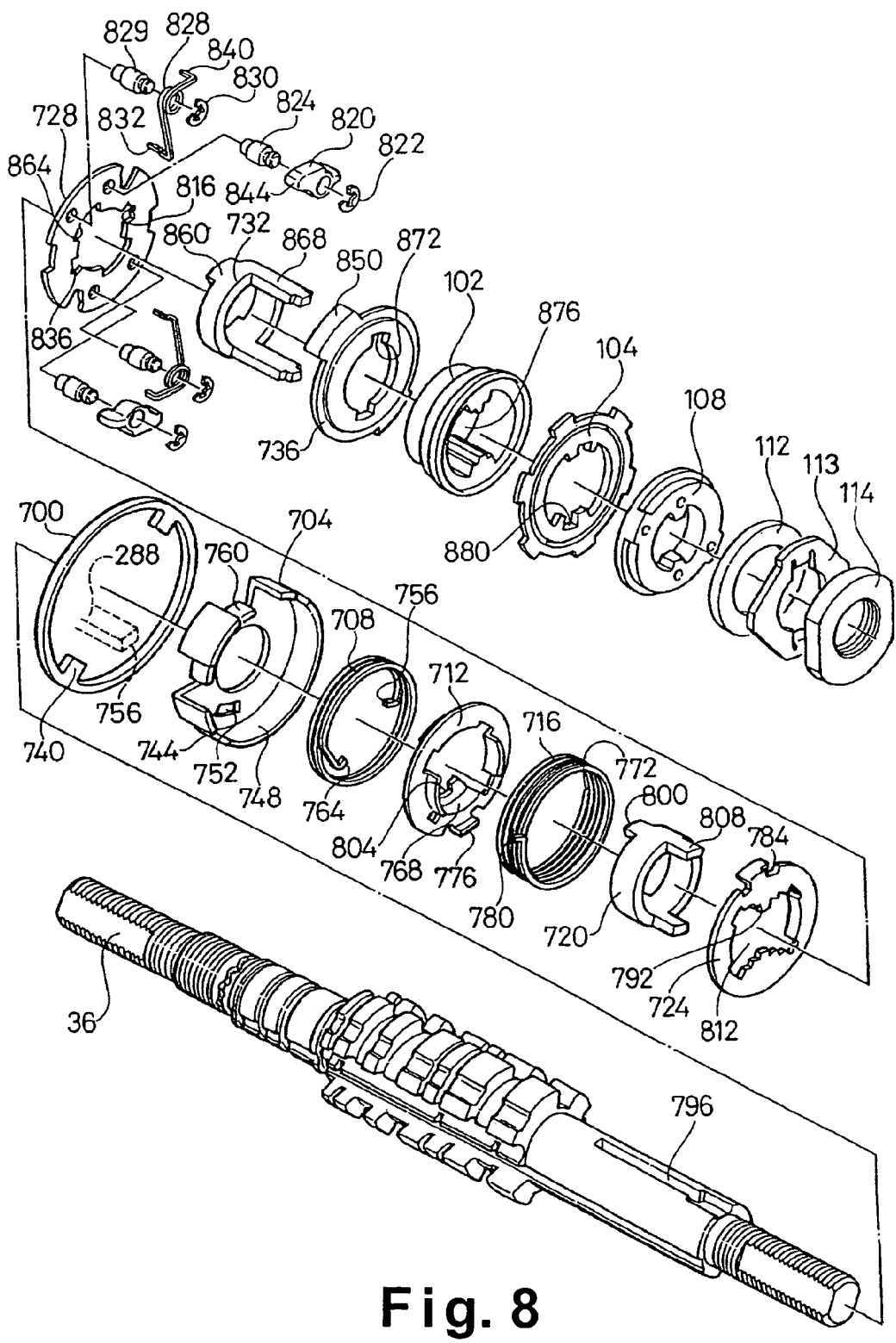
FIG. 8 is an exploded view of a shift assist mechanism used in a hub transmission of the internal gear shifting hub, in accordance with the present invention.

FIG. 8 is a partial exploded view of the shift assist mechanism 90 disposed on the hub shaft 36. FIG. 9 is a detailed view of the shift assist mechanism 90 when the clutch ring 623 is linked to the planet gear carrier 550, and FIG. 10 is a detailed view of the shift assist mechanism 90 when the link between the clutch ring 623 and the planet gear carrier 550 is disengaged.

Figure 10:
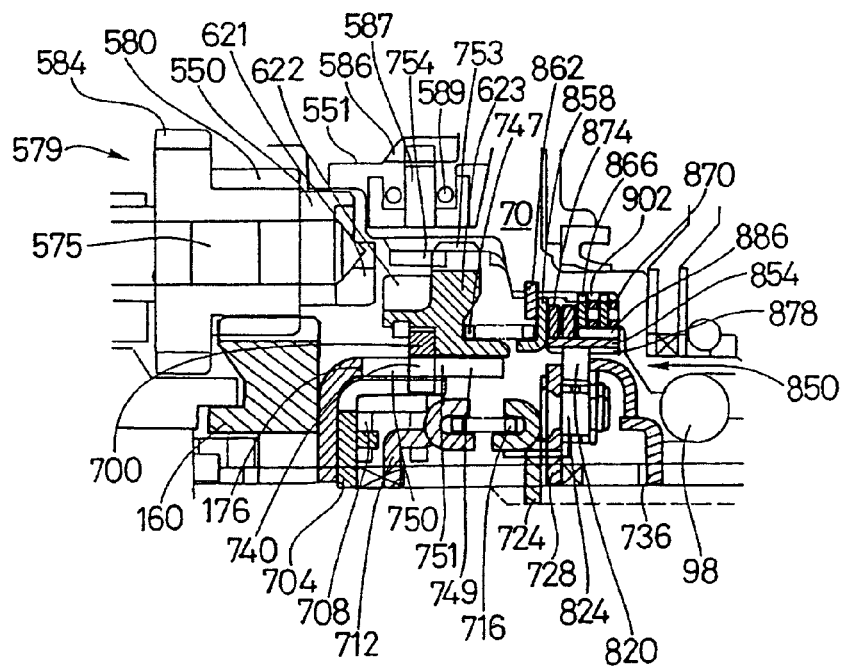
FIG. 10 is a detailed view of the shift assist apparatus that includes the force control mechanism in the operative state, in accordance with the present invention.

As shown in FIGS. 8, 9 and 10, the shift assist mechanism 90 includes an annular shift key member 700, a shift key member guide part 704, a saver spring 708, a spring washer 712, a return spring 716, a shift sleeve 720, a spring washer 724, a pawl supporter 728, a shift sleeve 732, and a pawl control washer 736.

The shift key member 700 also includes cam followers 740 that extend through the clutch cam parts 176 of the first sun gear 160 (see FIG. 9). The cam followers 740 further extend radially inwardly into grooves 744 formed in the side wall 748 of the shift key member guide part 704 (see FIG. 9).

As shown in FIGS. 9 and 10, the clutch cam parts 176 of the first sun gear 160 each include a cam surface 749 that forms first cam steps 750 and second cam steps 751. Furthermore, leftward force is applied to the clutch ring 623 by a clutch pressure spring 747. Therefore, when the shift key member 700 is at the position indicated in FIG. 9, the planet gear carrier engaging splines 622 of the clutch ring 623 engage with the clutch engaging splines 621 of the planet gear carrier 550. Further, with the shift key member 700 in the position shown in FIG. 9, the multiple drive cylinder engaging splines 753 on the circumference of the clutch ring 623 non-rotatably engage with the multiple auxiliary clutch engaging splines 754 of the drive cylinder 70. As a result, the drive cylinder 70 is integrally linked with the clutch ring 623, and the cam followers 740 of the shift key member 700 and rotate together therewith. However, as shown in FIG. 10, when the shift key member 700 rotates, the cam followers 740 thereof move along the axial length of the second cam steps 751 of the first sun gear 160. With the shift key member 700 is at the position shown in FIG. 10, the planet gear carrier engaging splines 622 of the clutch ring 623 become separated from the clutch engaging splines 621 of the planet gear carrier 550, and the planet gear carrier 550 is no longer directly linked to the drive cylinder 70.

The shift key member guide part 704 also includes a shift control sleeve linkage opening 752 that couples the shift key member guide part 704 to the end 756 of the pawl control sleeve 288. The saver spring 708 and the spring washer 712 are both disposed inside the side wall 748 of the shift key member guide part 704. The first end 756 of the saver spring 708 extends axially inwardly and is retained by a spring ledge 760 formed on the shift key member guide part 704. The second end 764 of the saver spring 708 is retained by a side end of a sleeve linking ledge 768 formed on the spring washer 712.

A first end 772 of the return spring 716 is retained by a spring ledge 776 formed on the spring washer 712. A second end 780 of the return spring 716 is held by a spring ledge 784 formed on the spring washer 724. The spring washer 724 includes two diametrically opposed shaft engaging protrusions 792 that are press-fitted into shaft grooves 796 (only one of which is shown in FIG. 8) that are formed in the hub shaft 36. The shaft grooves 796 extend along a portion of the length of the hub shaft 36 and on diametrically opposite sides of the hub shaft 36. Because the spring washer 724 non-rotatably engages with the hub shaft 36, the return spring 716 applies force to the spring washer 712 to cause it to rotate clockwise relative to the spring washer 724.

Two left linking legs 800 that are formed on the shift sleeve 720 in a diametrically opposed fashion non-rotatably engage with auxiliary grooves disposed in the sleeve linking ledges 768 (only one of which is shown in FIG. 8) of the spring washer 712. Two diametrically opposed right linking legs 808 that are formed on the shift sleeve 720 extend through a central opening 812 in the spring washer 724 and non-rotatably engage with auxiliary shift sleeve linking grooves 816 in the pawl supporter 728. Therefore, the spring washer 712, shift sleeve 720 and pawl supporter 728 rotate together as a single unit.

The pawl supporter 728 supports two pawls 820 that are diametrically opposite one another with respect to the pawl supporter 728. The pawls 820 are rotatably mounted to a pawl support pin 824 by a C-shaped clip 822. The pawl support pins 824 are mounted to the pawl supporter 728. Similarly, pawl pressure springs 828 are each mounted around the circumference of a spring support pin 829, and are secured by a C-shaped clip 830. One end 832 of each pawl pressure spring 828 is engaged with a spring holding ledge 836 of the pawl supporter 728. An opposite end 840 engages the corresponding pawl 820 and applies radial outward biasing force to the pawl's other end 844. A pawl control washer 736 includes two pawl control ledges 850 that are diametrically opposite one another and extend axially. The pawl control ledges 850 normally press the pawls 820 radially inward. As described below, when the pawl control ledges 850 move in the direction of separation from the pawls 820, the pawls 820 move radially outward and engage with the ratchet teeth 882 of an auxiliary cam 854 (see FIG. 10).

Figure 15:
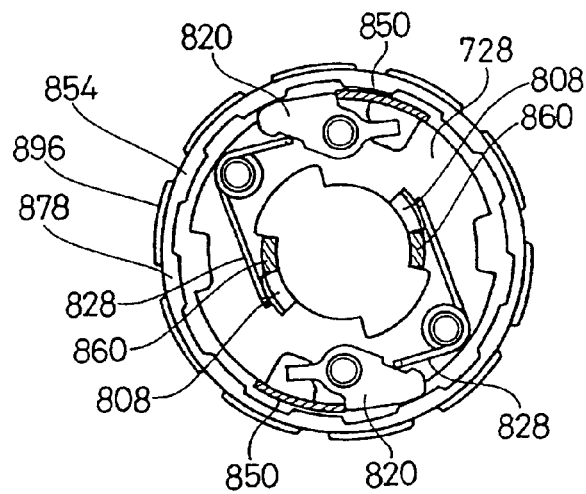
FIG. 15 is a cross-sectional view of the shift assist apparatus in the inoperative state taken along the XIV—XIV line in FIG. 9, in accordance with the present invention.

As shown in FIG. 8, the shift sleeve 732 is formed with two left linking legs 860 diametrically opposite each other and two right linking legs 868 that are diametrically opposite each other. The left linking legs 860 contact the right linking legs 808 of the shift sleeve 720, as shown in FIG. 15. As shown in FIG. 8, the right linking legs 868 extend through linking grooves 872 formed in the pawl control washer 736 and an opening 876 formed in the bearing cone 102. The right linking legs 868 are further non-rotatably engaged with auxiliary shift sleeve linking grooves 880 formed in the actuator plate 104. Therefore, the shift sleeve 732, pawl control washer 736 and actuator plate 104 rotate together as a single unit. However, as described below, the shift sleeve 732 can rotate clockwise relative to the shift sleeve 720 and the pawl supporter 728.

Figure 11:
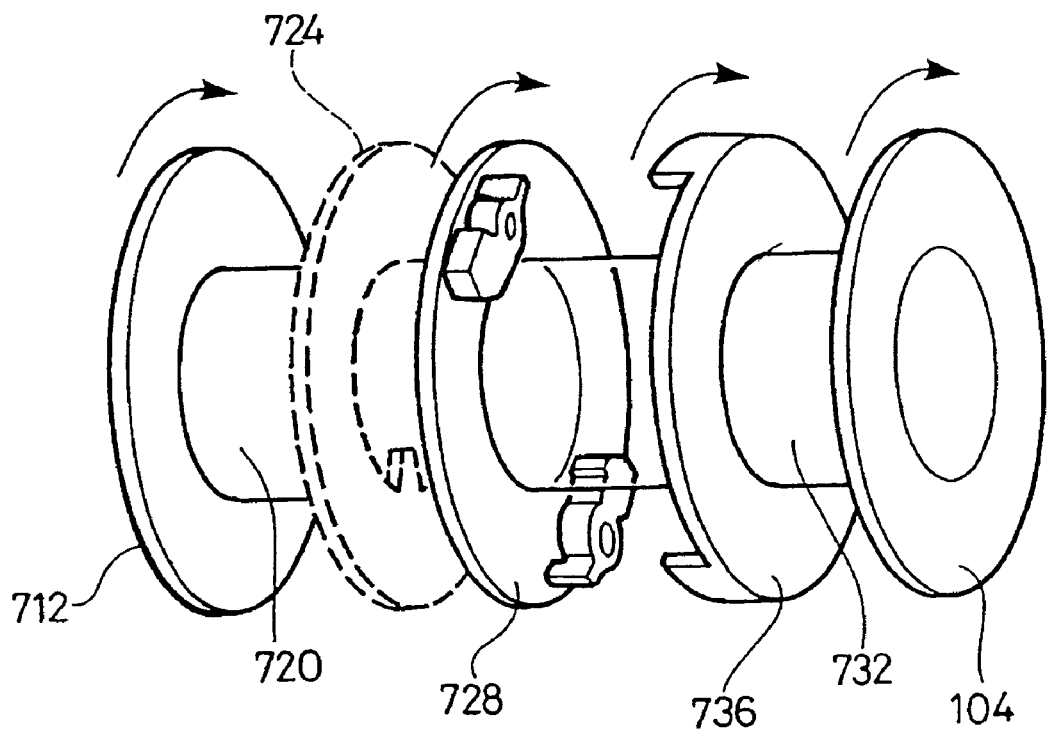
FIG. 11 is an exploded view showing portions of the shift assist apparatus and the direction of force transmission, in accordance with the present invention.

As shown in FIG. 11 in a simplified rendering, the return spring 716 applies force to the spring washer 712 in the clockwise rotational direction relative to the spring washer 724. The spring washer 712 is linked to the pawl supporter 728 via the shift sleeve 720. With the pawl supporter 728 linked to the actuator plate 104 via the shift sleeve 732, clockwise rotational force is also applied to the actuator plate 104. Since the actuator plate 104 is initially positioned in the right-rotation position, the transmission path in the power transmitting mechanism 82 is selected by subsequently causing the actuator plate 104 to rotate counter-clockwise.

The shift assist mechanism 90 further includes a force control mechanism 850 that controls the amount of force transmitted to the pawl control sleeve 288 from the drive cylinder 70. Specifically, if there is incomplete shifting of the pawl control sleeve 288, the pawl control sleeve 288 is prevented from being damaged. As is indicated in FIGS. 9 and 10, the force control mechanism 850 includes an annular auxiliary cam 854, an annular stopper plate 858, a pair of first annular force control members 866, a pair of second annular force control members 870 and a force control force-applying device includes a pair of wave washers 874.

The annular auxiliary cam 854 that is held in a fixed position by the annular stopper plate 858 and a lock ring 862. The pair of first annular force control members 866 are linked such that they rotate together with the drive cylinder 70. The pair of second annular force control members 870 that are linked such that they rotate together with the auxiliary cam 854. The pair of wave washers 874 of the force control force-applying device bias the first and second force control members 866 and 870.

Figure 12:
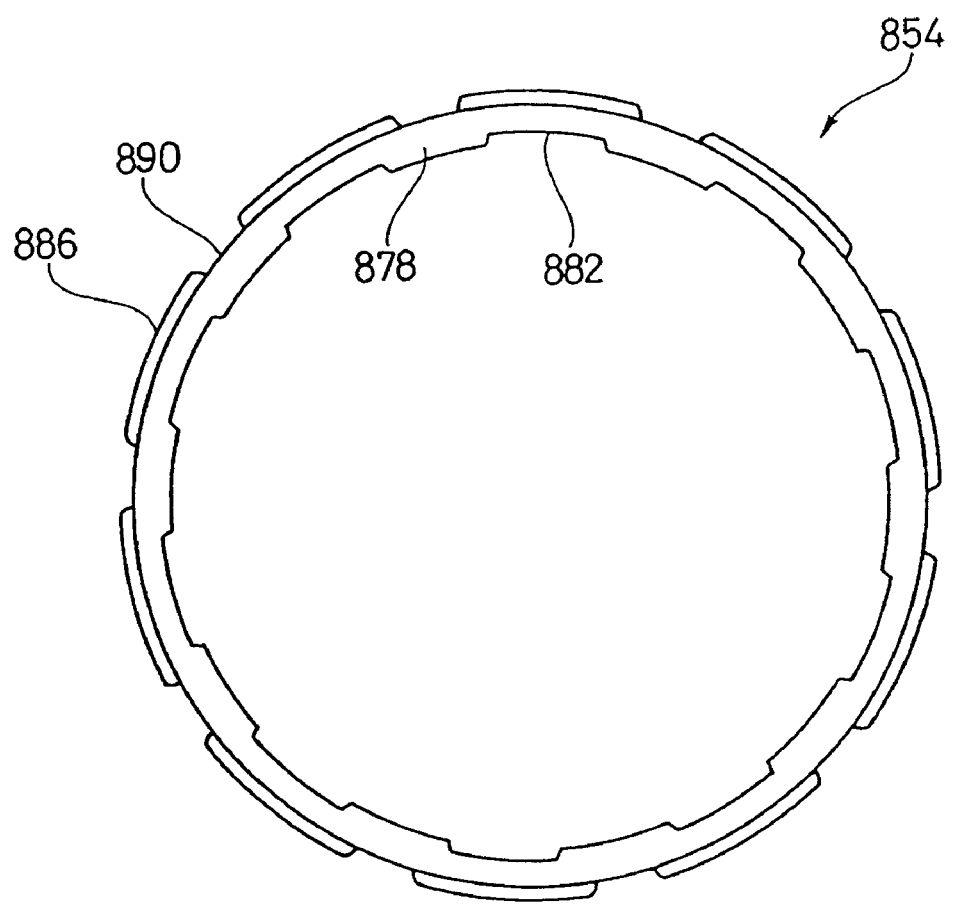
FIG. 12 is a front view of an auxiliary cam, in accordance with the present invention.
Figure 13:
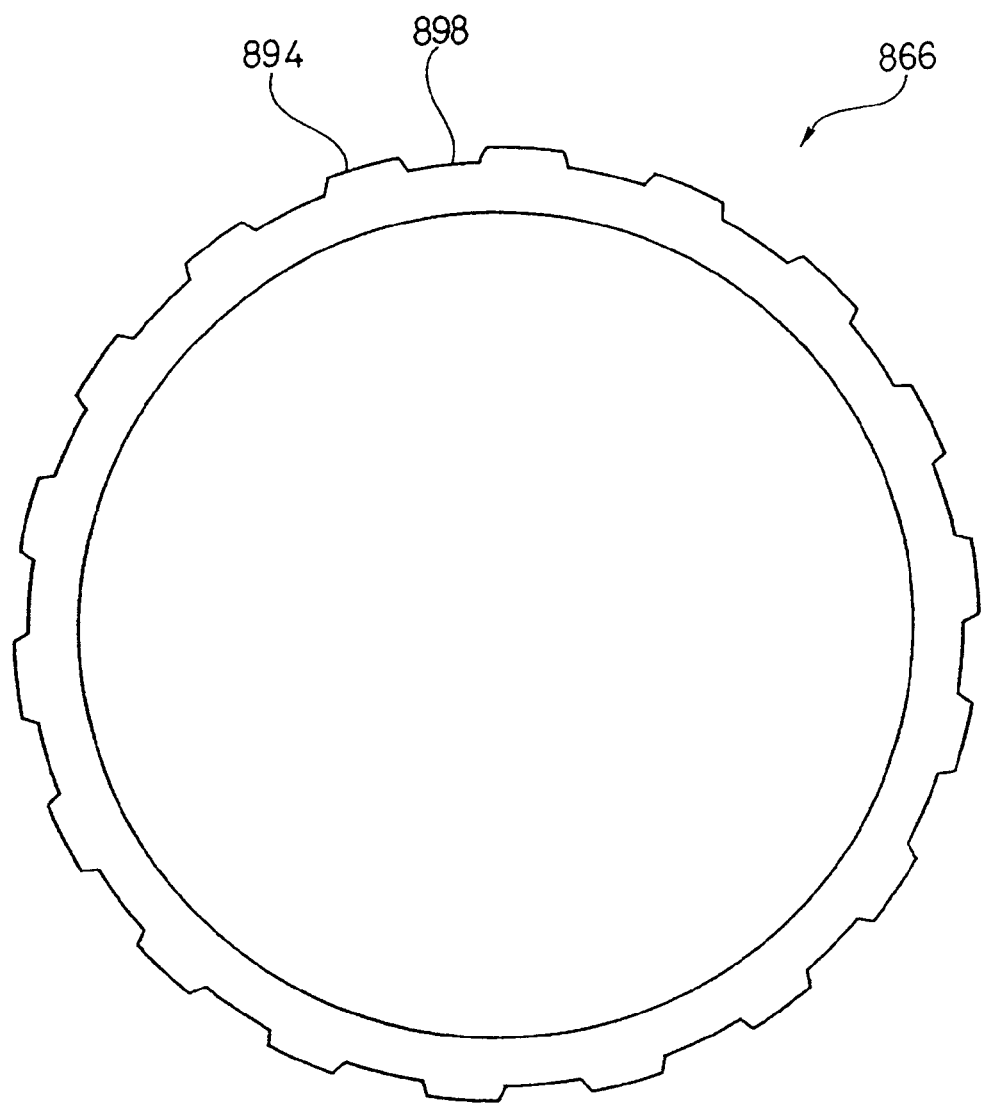
FIG. 13 is a front view of a first force control member, in accordance with the present invention.

As shown in FIG. 12, the auxiliary cam 854 includes multiple clutch teeth 878 that are disposed on the inner circumferential surface 882 and engage with the pawls 820 via a method described below. The auxiliary cam 854 also includes a plurality of auxiliary splines 886 that are disposed on the outer circumferential surface 890. As shown in FIG. 13, each first force control member 866 includes a plurality of first force control member splines 894 disposed on the outer circumferential surface 898. While the first force control members 866 rotate together with the drive cylinder 70, the first force control member splines 894 slidably engage corresponding multiple drive cylinder splines 902 formed on the inner circumferential surface of the drive cylinder 70. Consequently, the first force control members 866 can move in the axial direction relative to the drive cylinder 70.

Figure 14:
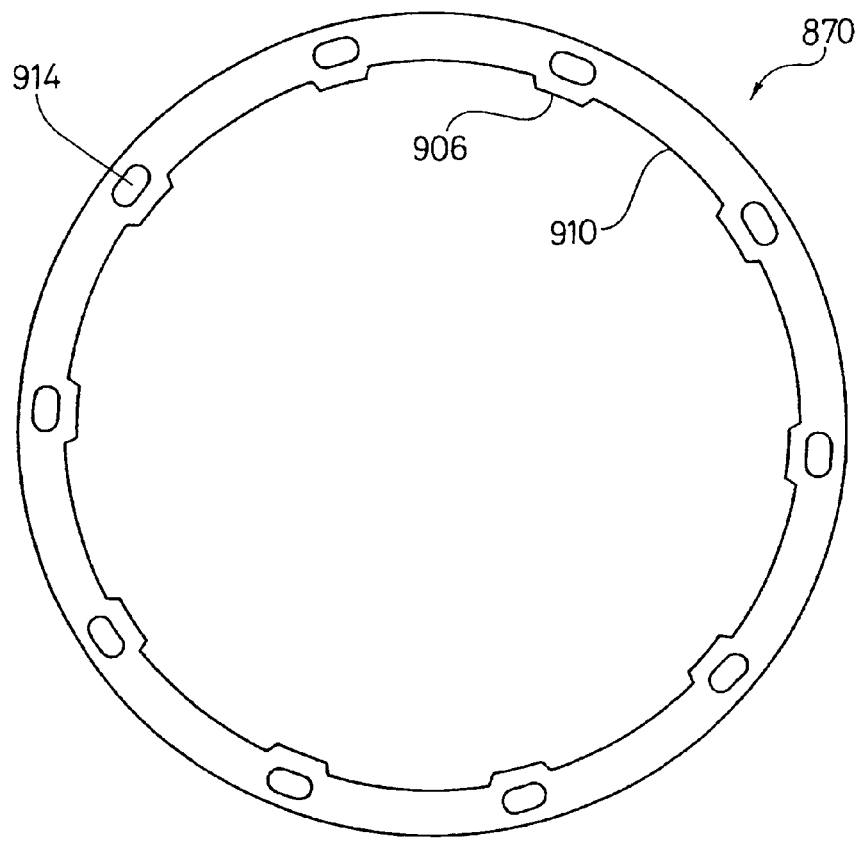
FIG. 14 is a front view of a second force control member, in accordance with the present invention.

As shown in FIG. 14, each second force control member 870 includes multiple second force control member splines 906 disposed on the inner circumferential surface 910. While the second force control members 870 rotate together with the auxiliary cam 854, the second force control member splines 906 slidably engage with the multiple auxiliary cam splines 886 on the auxiliary cam 854. Consequently, the second force control members 870 are able to move in the axial direction relative to the auxiliary cam 854. The second force control members 870 also include a plurality of circumferentially spaced apart openings to retain lubricant therein.

When assembled, the first force control members 866 are engaged by the second force control members 870 so that the first force control members 866 and the second force control members 870 are in mutual contact. As well, the first force control members 866 and the second force control members 870 are pressed into mutual contact by the wave washers 874. Therefore, so long as the auxiliary cam 854 and the second force control members 870 do not significantly hinder the rotation of the drive cylinder 70 and the first force control members 866, the drive cylinder 70, the first force control members 866, the second force control members 870 and the auxiliary cam 854 rotate together as a single unit. When the frictional force between the first force control members 866 and the second force control members 870 is overcome, the auxiliary cam 854 and the second force control members 870 rotate relative to the drive cylinder 70 and the first force control members 866. The rotation of the drive cylinder 70 and the first force control members 866 can possibly be hindered when the pawl control sleeve 288 cannot rotate, or conversely, when the pawl control sleeve 288 cannot complete shifting. In order to avoid damage to components, when such excessive resistance exists, the frictional force between the first force control members 866 and the second force control members 870 is overcome, and the auxiliary cam 854 and the second force control members 870 rotate relative to the drive cylinder 70 and the first force control members 866. When the rider thereafter reduces the friction of pedaling, shifting can be completed and the components can resume normal operation.

Gear Shifting of the Internal Gear Shifting Hub

The hub gear shifting operation will now be described.

Table 1 shows the connections between the various parts when in each gear, and Table 2 shows the force transmission path for each gear.

TABLE 1

| Gear | Clutch ring 63 | Sun gear 164 | Sun gear 168 | Sun gear 172 | Gear ratio |
|---|---|---|---|---|---|
| 1 (Low) | Disengaged | Free | Free | Free | 0.53 |
| 2 | Disengaged | Free | Free | Locked | 0.64 |
| 3 | Disengaged | Free | Locked | Free | 0.74 |
| 4 | Disengaged | Locked | Locked | Free | 0.85 |
| 5 | Engaged | Free | Free | Free | 1.00 |
| 6 | Engaged | Free | Free | Locked | 1.22 |
| 7 | Engaged | Free | Locked | Free | 1.42 |
| 8 (High) | Engaged | Locked | Free | Free | 1.62 |

TABLE 2

| Gear | Force transmission path |
|---|---|
| 1 | Drive cylinder 70 → pawls 587 → first ring gear 551 → planet gear carrier 550 (planet gears 579 revolve around first sun gear 160)→ pawls 908 → hub shell 74 |
| 2 | Drive cylinder 70 → pawls 587 → first ring gear 551 → planet gear carrier 550 (planet gears 579 revolve around first sun gear 160, planet gears 608 revolve around fourth sun gear 172) → second ring gear 553 → roller clutch 628 → hub shell 74 |
| 3 | Drive cylinder 70 → pawls 587 → first ring gear 551 → planet gear carrier 550 (planet gears 579 revolve around first sun gear 160, planet gears 608 revolve around third sun gear 168) → second ring gear 553 → roller clutch 628 → hub shell 74 |
| 4 | Drive cylinder 70 → pawls 587 → first ring gear 551 → planet gear carrier 550 (planet gears 579 revolve around first sun gear 160, planet gears 608 revolve around second sun gear 164) → second ring gear 553 → roller clutch 628 → hub shell 74 |
| 5 | Drive cylinder 70 → clutch ring 623 → planet gear carrier 550 → pawls 908 → hub shell 74 |
| 6 | Drive cylinder 70 → clutch ring 623 → planet gear carrier 550 (planet gears 608 revolve around fourth sun gear 172) → second ring gear 553 → roller clutch 628 → hub shell 74 |

TABLE 2-continued

| Gear | Force transmission path |
| --- | --- |
| 7 | Drive cylinder 70 → clutch ring 623 → planet gear carrier 550 (planet gears 608 revolve around third sun gear 168) → second ring gear 553 → roller clutch 628 → hub shell 74 |
| 8 | Drive cylinder 70 → clutch ring 623 → planet gear carrier 550 (planet gears 608 revolve around second sun gear 168) → second ring gear 553 → roller clutch 628 → hub shell 74 |

The timing of the linking mechanism during shifting from fourth gear to fifth gear, such as during bicycle acceleration, is set to follow the sequence shown in Table 3 below.

TABLE 3

| Gear | Clutch ring 623 | Sun gear 164 | Sun gear 168 | Sun gear 172 |
| --- | --- | --- | --- | --- |
| 4 | Disengaged | Locked | Locked | Free |
| (Same as 3) | Disengaged | Free | Locked | Free |
| (Same as 7) | Engaged | Free | Locked | Free |
| 5 | Engaged | Free | Free | Free |

Therefore, when the rider shifts from fourth to fifth gear during bicycle acceleration, the third sun gear 168 becomes engaged and the second sun gear 164 is disengaged, creating a state identical to third gear. As one would expect during bicycle acceleration, the rider can identify this state from a slight increase in pedal speed. The clutch ring 623 then engages with the planet gear carrier 550, creating a state identical to seventh gear. As one would expect when the transmission is shifted to a high gear ratio, the rider can identify this state from a decrease in pedal speed. The sun gear 168 is then disengaged and the desired fourth gear is reached. If the sun gear is disengaged before the clutch ring 623 is engaged, the transmission enters a state identical to first gear, creating the highly undesirable state of rapid pedal acceleration, and significant impact is generated when shifting of the transmission to fifth gear is completed.

This sequence is particularly beneficial when the bicycle is decelerating and the rider wishes to shift from fifth gear to fourth gear. In this case, the pedals are slowed down by temporarily switching from fifth gear to seventh gear, but this situation is better than the clutch ring being disengaged first. If the clutch ring 623 is first disengaged, the transmission enters a state identical to first gear, in which the pedals accelerate rapidly. This rapid acceleration in pedal speed is undesirable when climbing a hill, for example. The transmission then temporarily switches from seventh gear to third gear. As a result, the pedals accelerate, but because third gear is adjacent to fourth gear, where the rider just was, this switching is strongly preferred. The transmission then switches to the desired fourth gear. In light of the undesirability of rapid pedal acceleration or deceleration, this entire process of shifting from fifth to fourth gear is intended to avoid such acceleration or deceleration.

As described above, the shift assist mechanism 90 also uses the rotational force of the drive cylinder 70 to support the switching of the force transmission path in the power transmitting mechanism 82. This function is desirable where a significant drive force is applied to the sprocket 54 and there is significant resistance to the engagement or disengagement of various components. During normal operation, the actuator plate 104, shift sleeve 732, pawl control washer 736, pawl supporter 728, shift sleeve 720, spring washer 712, shift key member guide part 704 and pawl control sleeve 288 rotate together as a single unit, linking or releasing various components. As a result, the linking legs 860 of the shift sleeve 732, the pawl control ledges 850 of the pawl control washer 736 and the pawls 820 and linking legs 808 of the shift sleeve 720 are positioned as shown in FIG. 15. In this state, the pawls 820 are disengaged from the ratchet teeth 878 of the auxiliary cam 854. However, where substantial drive force is applied to the sprocket 54 and significant resistance accordingly occurs to the operation of the pawl control sleeve 288, the pawl control sleeve 288 tends to stop regardless of the rotation of the actuator plate 104.

Figure 16:
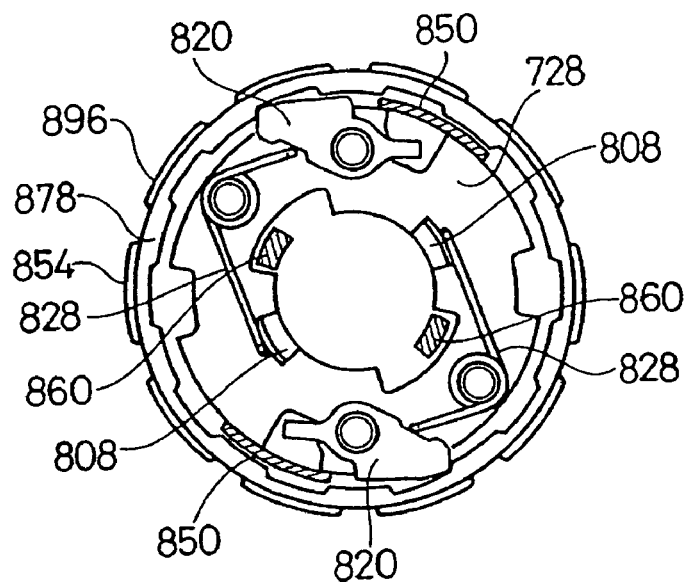
FIG. 16 is a cross-sectional view of the shift assist apparatus in the operative state taken along the XIV—XIV line in FIG. 9, in accordance with the present invention.
Figure 17:
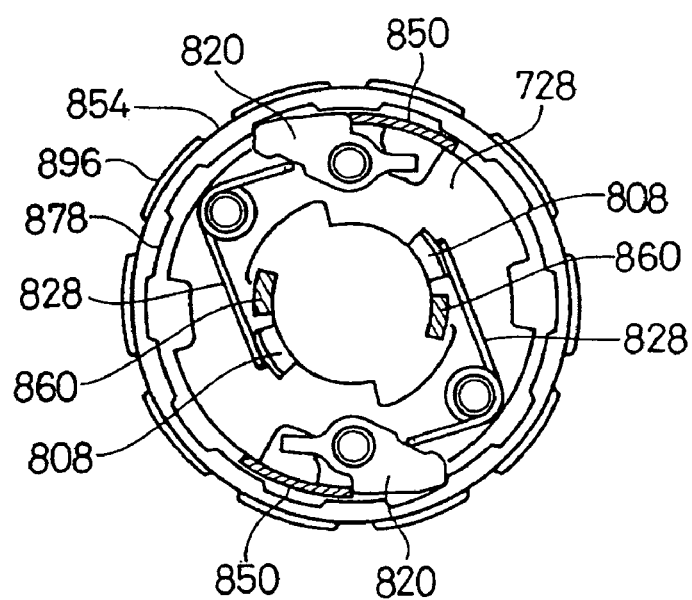
FIG. 17 is a cross-sectional view of the shift assist apparatus that is in the process of transitioning to the inoperative state taken along the XIV—XIV line in FIG. 9, in accordance with the present invention.

In this case, the shift sleeve 732 rotates clockwise relative to the shift sleeve 720, causing the pawl control washer 736 to rotate clockwise relative to the pawl supporter 728, and the pawl control ledges 850 move in the direction of disengagement from the pawls 820, as shown in FIG. 16. As a result, the pawls 820 rotate radially outward and engage with the ratchet teeth 878 of the auxiliary cam 854 so that the pawl supporter 728 will rotate together with the auxiliary cam 854 and the drive cylinder 70. Consequently, the shift sleeve 720, shift key member guide part 704 and pawl control sleeve 288 rotate in sequence, and auxiliary force to complete the gear shift operation is provided. If the resistance from the pawl control sleeve 288 is overcome, the pawl supporter 728 rotates clockwise relative to the pawl control washer 736 until gear shifting is completed and the state shown in FIG. 15 is returned to, as shown in FIG. 17. As described above, so long as the auxiliary cam 854 and the second force control members 870 present no significant hindrance to the rotation of the drive cylinder 70 and the first force control members 866, the drive cylinder 70, first force control members 866, second force control members 870 and auxiliary cam 54 can rotate together as a single unit.

Construction of Generator Mechanism

The generator mechanism 88 basically includes a stator 28 and a rotor 29, as shown in FIG. 3. The electric power generated by this generator mechanism 88 is transmitted via a connector 60.

The stator 28 basically include two stator yokes 61 and 62, a bobbin 64 around which is would a coil 63, and a cylindrical core yoke 65. The stator yokes 61 and 62, bobbin 64 and cylindrical core yoke 65 form a single unit when they are assembled. The stator 28 is secured to the hub shaft 36 by any of a variety of attachment methods, such as press fitting, adhesives or fasteners.

The stator yokes 61 and 62 respectively include disk parts 61a and 62a and claws 61b and 62b. Preferably, there are fourteen claws 61b and 62b are respectively formed along the circumferences of the disk parts 61a and 61b at equally spaced apart intervals, and extend in an axial direction from the outer circumferential edges of the disk parts 61a and 62a of the respective stator yokes 61 and 62. When the stator yokes 61 and 62 are assembled, the claws 61b and 62b are aligned in the circumferential direction at equally spaced apart intervals with gaps formed therebetween. Furthermore, a permanent magnet 67 of the rotor 29 extends around the claws 61b and 62b such that it faces the claws 61b and 62b, but is positioned radially outward therefrom. Moreover, the disk parts 61a and 62a of the stator disks 61 and 62 are formed with a round hole that allows the hub 36 to pass therethrough. The disk parts 61a and 62a are also formed with slits that extend radially outward from the round hole.

The bobbin 64 is an annular member preferably made of a resin material. A groove is formed in the external circumference of the bobbin 64 that holds the coil 63 wound around the bobbin 64. An internal circumferential surface of the bobbin 64 is also formed with a notch having steps that engage with the cylindrical core yoke 65.

The cylindrical core yoke 65 preferably includes twelve assemblies of separate pieces that engage the notch of the internal circumference of the bobbin 64 thereby mounting the cylindrical core yoke 65 to the inside of the bobbin 64. The separate-piece assemblies that form the cylindrical core yoke 65 each include four separate pieces consisting of thin rectangular plates fitted together. When these separate-piece assemblies are pressed into the notch in the inner circumference of the bobbin 64, twelve separate-piece assemblies make up the cylindrical core yoke 65 having in the center thereof an empty space with a square cross-sectional configuration into which the hub shaft 36 is inserted. The separate pieces are stacked in a parallel fashion along the axial direction to form the cylindrical core yoke 65.

The external rotator 29 has mainly a cap member 66 secured to the hub shell 74 and a permanent magnet 67, which are formed together as a single unit. This integrally formed external rotator 29 is fitted and secured to the inner circumferential surface of the hub shell 74.

The permanent magnet 67 include four magnet portions that are fixed at spaced apart intervals are to the circumferential surface of the cap member 66. The permanent magnet 67 has alternating N and S poles arranged at the space apart intervals, such that each of the total of 28 poles faces a claw 61b or 62b of the stator yokes 61 or 62.

Power Generation and Operation of Generator Mechanism

Operation of the generator mechanism 88 for generating power in the internal gear shifting hub 14 will now be explained.

When the bicycle 10 is ridden, the hub shell 74 rotates relative to the hub shaft 36. As well, the rotator 29 fixed to the inner circumferential surface of the hub shell 74 rotated freely about the stator 28 fixed to the hub shaft 36. When this occurs, the permanent magnet 67 rotates around the outside of the claws 61b and 61b of the stator yokes 61 and 62.

As a result, when the claws 61b of the stator yoke 61 receive N-pole magnetic flux from the permanent magnet 67, the claws 62b of the stator yoke 62 receive S-pole magnetic flux. Then in an alternating sequence, the claws 61b of the stator yoke 61 receive S-pole magnetic flux from the permanent magnet 67 and the claws 62b of the stator yoke 62 receive N-pole magnetic flux. In other words, due to the rotation of the permanent magnet 67 around the outside of the claws 61b and 62b of the stator yokes 61 and 62, a first state in which the stator yoke 61 is an S-pole and the stator yoke 62 is an N-pole and a second state in which the stator yoke 61 is an N-pole and the stator yoke 62 is an S-pole are repeated, and alternating magnetic flux that runs in the hub axial direction occurs in the cylindrical yoke 65 that magnetically links the stator yokes 61 and 62. Due to this alternating magnetic flux occurring inside the coil 63, electric current is generated in the coil 63, whereby electric power is generated. By supplying the generated electric power from the connector 60 to the gear positioning unit 48 via the condenser element 49 through electric wiring, electric gear shifting of the internal gear shifting hub 14 can be achieved.

Using the internal gear shifting hub 14 having the above construction, because the generator mechanism 88 is disposed next to the power transmitting mechanism 82 in the internal gear shifting hub 14, consumption of the condenser element 49 acting as a power supply can be minimized even when the shift mechanism undergoes gear shifting via the gear positioning unit 48. For example, by storing the power generated by the generator mechanism 88 in the condenser element 49 and using the condenser element 49 as a power supply, the condenser element 49 can be continuously charged when the bicycle is being ridden and consumption of the power supply can be minimized. Therefore, where the internal gear shifting hub 14 is to be operated by the gear positioning unit 48, long-term operation can be carried out in as stable a fashion. Furthermore, because the generator mechanism 88 is disposed in the internal gear shifting hub 14, there is no longer a need for a separate generator mechanism 88 on the bicycle.

While various embodiments of the present invention are described herein, the present invention may be modified without deviating from the drawings and claims. In addition, the descriptions of the multiple embodiments of the present invention are intended only to provide examples thereof, and the present invention is not limited by the claims or similar definitions. For example, the sizes, configuration, positions, directions and the like of the various components may be changed as desired. The functions of one element may be performed by two elements, or vice versa. It is not necessary that all of the advantages of the embodiments exist at the same time. The unique functions that are not present in the conventional art, regardless of whether such functions are realized by themselves or in combination with other functions, should be deemed to belong to the applicant's unique invention, including constructions realized based on such functions and the concepts thereof. Therefore, the scope of the present invention is not limited to the particular constructions disclosed herein, or to the initial emphasis on particular constructions or functions.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

ALTERNATE EMBODIMENTS

Alternate embodiments will now be explained. In view of the similarity between the embodiments, the parts of the alternate embodiments that are identical to the parts of the first embodiment will be given the same reference numerals as the parts of the first embodiment. Moreover, the descriptions of the parts of the alternate embodiment that are identical to the parts of the first embodiment may be omitted for the sake of brevity.

In the first embodiment, the power transmitting mechanism 82 of the internal gear shifting hub 14 was described as having eight force transmission paths, but any number of force transmission paths is possible so long as there are more than one.

In the first embodiment, the generator mechanism 88 was described as a claw-pole type generator, but the generator mechanism can have any configuration so long as it generates electric power through the relative rotation of the hub shell 74 and the hub shaft 36.

In the first embodiment, the gear positioning unit 48 is linked to the actuator plate 104 that serves as an operation member via the gear shift cable 30. Alternatively, the gear positioning unit 48 can be mounted to the hub 36 and the gear positioning unit 48 directly connected to actuator plate 104 for rotation thereof, and gear shifting. In this case, if the gear positioning unit 48 is assembled as a single unit together with the gear shift controller and the condenser element, the electric wiring from the generator mechanism to the gear positioning unit and the like can be incorporated into the internal gear shifting hub 14.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle internal gear shifting hub, comprising:
    a hub shaft arranged and configured for non-rotatable mounting to a rear portion of a bicycle frame;
    a drive cylinder rotatably mounted to the hub shaft;
    a cylindrical hub shell rotatably mounted to the hub shaft;
    a power transmitting mechanism mounted between the drive cylinder and the cylindrical hub shell for selectively transmitting rotary power from the drive cylinder to the cylindrical hub shell via one of a plurality of transmission paths;
    a shift mechanism connected to the power transmitting mechanism arranged and configured to shift between the plurality of transmission paths;
    a generator mechanism mounted within the cylindrical hub shell adjacent to the power transmitting mechanism for generating electric power from rotary movement of the cylindrical hub shell;
    a shift assist mechanism arranged and configured to transmit a varied amount rotational force from the drive cylinder to the shift mechanism; and
    a force control mechanism mounted between the drive cylinder and the shift assist mechanism and coupling the drive cylinder to the shift assist mechanism to control the varied amount of rotational force transmitted from the drive cylinder to the shift mechanism.

2. The bicycle internal gear shifting hub according to claim 1, wherein
    the shift mechanism comprises an operation member and a pawl control sleeve;
    the operation member being rotatably mounted to the hub shaft; and
    the pawl control sleeve being rotatably supported around the hub shaft and linked to the operation member for rotational movement therewith.

3. The bicycle internal gear shifting hub according to claim 2, wherein
    the shift assist mechanism being arranged and configured to selectively transmit rotational force from the drive cylinder to the pawl control sleeve.

4. The bicycle internal gear shifting hub according to claim 3, wherein
    the shift assist mechanism includes first shift members, second shift members, and force applying devices;
    the first shift members being linked to the operation member such that they rotate together therewith;
    the second shift members being linked to the pawl control sleeve such that they rotate together therewith; and
    the force applying devices are arranged and configured to apply force to the first and second shift members such that in one condition the first shift members can rotate with the second shift members and in another condition the first shift members can rotate relative to the second shift members.

5. The bicycle internal gear shifting hub according to claim 2, wherein
    the generating mechanism includes a stator and a rotor;
    the stator having a coil member that is rotatably secured to the hub shaft; and
    the rotor having a permanent magnet, the rotor being mounted to the cylindrical hub shell.

6. The bicycle internal gear shifting hub according to claim 1, wherein
    the shift assist mechanism being arranged and configured to selectively transmit rotational force from the drive cylinder to the pawl control sleeve.

7. The bicycle internal gear shifting hub according to claim 6, wherein
    the shift assist mechanism includes first shift members, second shift members, and force applying devices;
    the first shift members being linked to the operation member such that they rotate together therewith;
    the second shift members being linked to the pawl control sleeve such that they rotate together therewith; and
    the force applying devices are arranged and configured to apply force to the first and second shift members such that in one condition the first shift members can rotate with the second shift members and in another condition the first shift members can rotate relative to the second shift members.

8. The bicycle internal gear shifting hub according to claim 1, wherein
    the generating mechanism includes a stator and a rotor;
    the stator having a coil member that is rotatably secured to the hub shaft; and
    the rotor having a permanent magnet, the rotor being mounted to the cylindrical hub shell.

9. The bicycle internal gear shifting hub according to claim 1, further comprising a brake mounting portion coupled to the cylindrical hub shell, the brake mounting portion being arranged and configured for mounting a hub brake device.

* * * * *